(12) United States Patent
Bersin et al.

(10) Patent No.: US 11,956,017 B2
(45) Date of Patent: Apr. 9, 2024

(54) SPECTRALLY MULTIPLEXED SOLID STATE QUANTUM EMITTERS AND MEMORIES FOR QUANTUM REPEATERS

(71) Applicant: Massachusetts Institute of Technology, Cambridge, MA (US)

(72) Inventors: Eric Alexander Bersin, Cambridge, MA (US); Carlos Errando Herranz, Brookline, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 405 days.

(21) Appl. No.: 17/412,877

(22) Filed: Aug. 26, 2021

(65) Prior Publication Data
US 2023/0344516 A1    Oct. 26, 2023

Related U.S. Application Data

(60) Provisional application No. 63/106,008, filed on Oct. 27, 2020.

(51) Int. Cl.
*H04B 10/02* (2006.01)
*G02F 1/35* (2006.01)
(Continued)

(52) U.S. Cl.
CPC .......... *H04B 10/29* (2013.01); *G02F 1/353* (2013.01); *G02F 1/3551* (2013.01); *H04B 10/70* (2013.01)

(58) Field of Classification Search
CPC ........ H04B 10/29; H04B 10/70; H04B 10/40; H04B 10/2507; G02F 1/353;
(Continued)

(56) References Cited

U.S. PATENT DOCUMENTS 8,073,336 B2 * 12/2011 Trifonov .............. H04L 9/0852
356/450
11,784,806 B2 * 10/2023 Figueroa ............ G01B 9/02017
380/278

OTHER PUBLICATIONS

Arcari et al., "Near-unity coupling efficiency of a quantum emitter to a photonic crystal waveguide." Physical Review Letters 113.9 (2014): 093603, 5 pages.
(Continued)

*Primary Examiner* — Hanh Phan
(74) *Attorney, Agent, or Firm* — Smith Baluch LLP

(57) ABSTRACT

A spectrally multiplexed quantum repeater (SMuQR) based on spatially arrayed nodes of frequency-multiplexed multi-qubit registers uses the natural inhomogeneous distribution of optical transition frequencies in solid state defect centers. This distribution enables spectrally selective, individual addressing of large numbers of defect centers within an optical diffraction limited spot along a long cavity or waveguide. The spectral selection relies on frequency shifting an incident optical field at a rate as fast as once per defect center lifetime. The defect centers are resonant at visible frequencies and emit visible single photons which are down-converted to a wavelength compatible with long-distance transmission via conventional optical fiber. The down-converted photons are all at the same telecommunications wavelength, with the different spectral bins mapped to different temporal bins to preserve the multiplexing in the time domain, for distribution to other nodes in the quantum network.

20 Claims, 12 Drawing Sheets

(51) Int. Cl.
   *G02F 1/355* (2006.01)
   *H04B 10/29* (2013.01)
   *H04B 10/70* (2013.01)

(58) Field of Classification Search
   CPC ... G02F 1/3551; H04L 9/0855; H04L 9/0858; H04L 9/0852
   USPC .. 398/79, 45, 48, 49, 50, 43, 158, 159, 140, 398/141, 173, 174, 176, 183, 188; 380/255, 256, 278, 277, 44
   See application file for complete search history.

(56) References Cited

OTHER PUBLICATIONS

Barrett et al., "Efficient high-fidelity quantum computation using matter qubits and linear optics." Physical Review A 71.6 (2005): 060310.1-060310.4. 4 pages.
Bassett et al., "Electrical tuning of single nitrogen-vacancy center optical transitions enhanced by photoinduced fields." Physical Review Letters 107.26 (2011): 266403, 5 pages.
Bersin et al., "Individual Control and Readout of Qubits in a Sub-Diffraction Volume," arXiv:1805.06884v2 [quant-ph], Aug. 20, 2018 (7 pages).
Bersin et al., "Individual control and readout of qubits in a sub-diffraction volume." npj Quantum Information 5.1 (2019): 1-6.
Bhaskar et al., "Experimental demonstration of memory-enhanced quantum communication." Nature 580.7801 (2020): 60-64. 17 pages.
Brimrose 3-Port Fiber Optical Switch Systems (OpticalSwitch) Product Data Sheet created on Jul. 7, 2017, accessed at brimrose.com on Jun. 1, 2022, 3 pages.
Brimrose Fiber-coupled-Dynamic Tunable Bandpass Filter (FCAOTF) Product Data Sheet created on Oct. 25, 2016, accessed at brimrose.com on Jun. 1, 2022, 3 pages.
Brimrose Fiber-coupled Acousto-Optic Modulators (FCAOM) Product Data Sheet created on Oct. 25, 2016, accessed at brimrose.com on Jun. 1, 2022, 3 pages.
Brimrose Fiber-coupled-Acousto-Optic Frequency Shifters (FCFS) Product Data Sheet created on Jul. 7, 2017, accessed at brimrose.com on Jun. 1, 2022, 4 pages.
Burek et al., "High quality-factor optical nanocavities in bulk single-crystal diamond." Nature Communications 5.1 (2014): 1-7.
Cabrillo et al., "Creation of entangled states of distant atoms by interference." Physical Review A 59.2 (1999): 1025, 9 pages.
Chen et al., "Parallel single-shot measurement and coherent control of solid-state spins below the diffraction limit," arXiv:2006.01823 [quant-ph], Jun. 2, 2020 (17 pages).
Davis et al., "Electro-optic steering of a laser beam." SPIE Newsroom 13 (2011). 3 pages.
Han et al., "Large-scale silicon photonic switches with movable directional couplers." Optica 2.4 (2015): 370-375.

Harris et al., "Quantum transport simulations in a programmable nanophotonic processor." Nature Photonics 11.7 (2017): 447-453.
Humphreys et al., "Deterministic delivery of remote entanglement on a quantum network." Nature 558.7709 (2018): 268-273.
Iwasaki et al., "Germanium-vacancy single color centers in diamond." Scientific Reports 5.1 (2015): 1-7.
Lodahl et al., "Chiral quantum optics." Nature 541.7638 (2017): 473-480.
Lodahl et al., "Interfacing single photons and single quantum dots with photonic nanostructures." Reviews of Modern Physics 87.2 (2015): 347-400.
Lu et al., "Electro-Optic Frequency Beam Splitters and Tritters for High-Fidelity Photonic Quantum Information Processing," Physical review letters 120.3 (2018): 030502, 6 pages.
Marauska et al., "Sputtered thin film piezoelectric aluminium nitride as a functional MEMS material and CMOS compatible process integration." Procedia Engineering 25 (2011): 1341-1344.
Meesala et al., "Strain engineering of the silicon-vacancy center in diamond." Physical Review B 97.20 (2018): 205444. 13 pages.
Mouradian et al., "Scalable integration of long-lived quantum memories into a photonic circuit." Physical Review X 5.3 (2015): 031009. 8 pages.
Nagy et al., "High-fidelity spin and optical control of single silicon-vacancy centres in silicon carbide." Nature Communications 10.1 (2019): 1-8.
Pfender et al., "Protecting a diamond quantum memory by charge state control." Nano Letters 17.10 (2017): 5931-5937.
Plander et al., "MEMS optical switch: Switching time reduction." Open Computer Science 6.1 (2016): 116-125.
Rao et al., "Single quantum-dot Purcell factor and $\beta$ factor in a photonic crystal waveguide." Physical Review B 75.20 (2007): 205437. 7 pages.
Rugar et al., "Generation of Tin-Vacancy Centers in Diamond via Shallow Ion Implantation and Subsequent Diamond Overgrowth." arXiv preprint arXiv:1910.14165 (2019), 16 pages.
Togan et al., "Quantum entanglement between an optical photon and a solid-state spin qubit." Nature 466.7307 (2010): 730-734.
Van Dam et al., "Multiplexed entanglement generation over quantum networks using multi-qubit nodes." Quantum Science and Technology 2.3 (2017): 034002, 9 pages.
Wan et al., "Large-scale integration of near-indistinguishable artificial atoms in hybrid photonic circuits." arXiv preprint arXiv:1911.05265 (2019). 11 pages.
Wang et al., "Multidimensional quantum entanglement with large-scale integrated optics." Science 360.6386 (2018): 285-291.
Wang et al., "Proposal and Proof-of-Principle Demonstration of Fast-Switching Broadband Frequency-Shifting for a Frequency-Multiplexed Quantum Repeater," arXiv:2010.06214v1 [quant-ph], Oct. 13, 2020 (7 pages).
Weber et al., "Two-photon interference in the telecom C-band after frequency conversion of photons from remote quantum emitters." Nature Nanotechnology 14.1 (2019): 5 pages.

\* cited by examiner

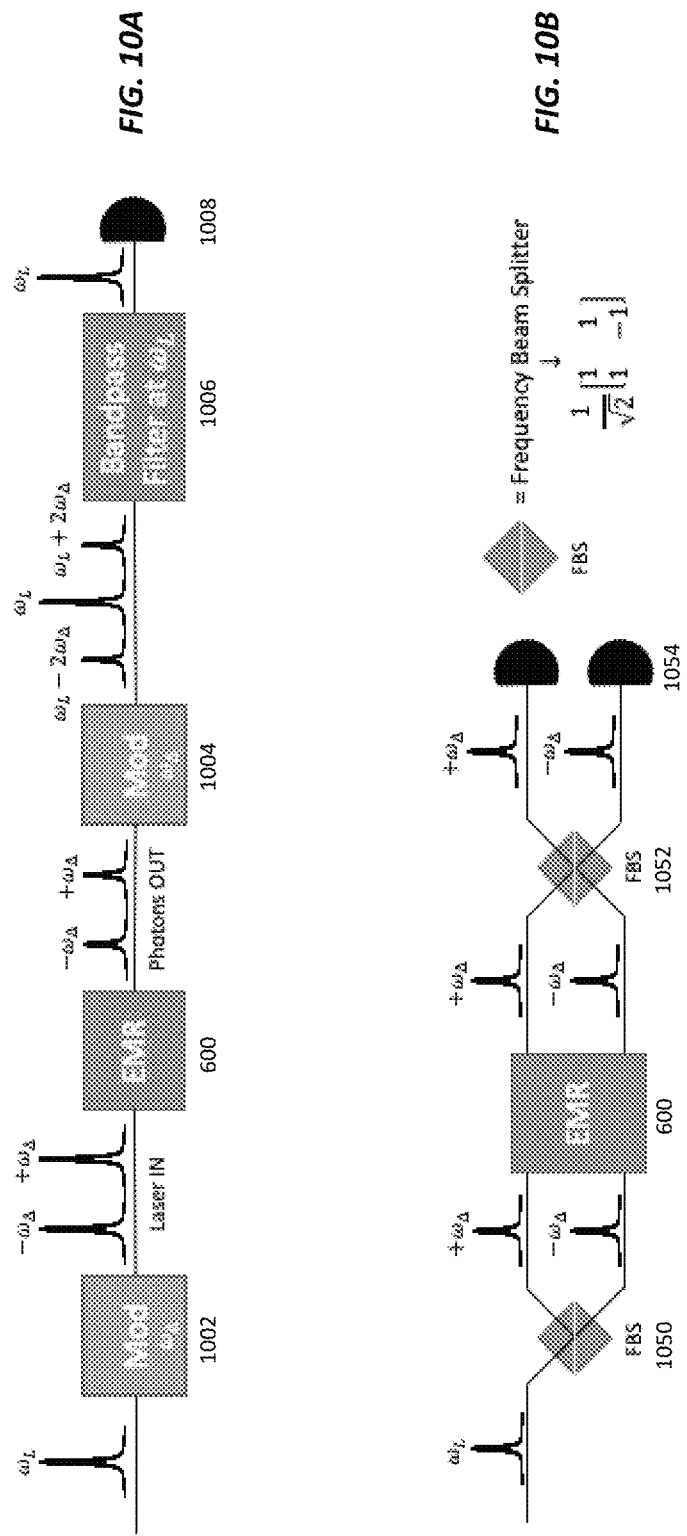

SPECTRALLY MULTIPLEXED SOLID STATE QUANTUM EMITTERS AND MEMORIES FOR QUANTUM REPEATERS

CROSS-REFERENCE TO RELATED APPLICATION(S)

This application claims the priority benefit, under 35 U.S.C. 119(e), of U.S. Application No. 63/106,008, which was filed on Oct. 27, 2020, and is incorporated herein by reference for all purposes.

GOVERNMENT SUPPORT

This invention was made with government support under EFMA1641064 and PHY1734011 awarded by the National Science Foundation, and FA8750-16-2-0141 awarded by the Air Force Research Laboratory Information Directorate. The government has certain rights in the invention.

BACKGROUND

Solid-state quantum emitters have shown great promise for the development of quantum photonic technologies due to their coherent optical transitions. Some such emitters, such as defect center spin qubits in diamond, further exhibit long spin coherence times, making them promising candidates for use in quantum repeaters. In particular, their solid-state nature makes them attractive candidates for large-scale implementations on electro-optic chips. However, large-scale fabrication and integration of individual devices remains a challenge.

SUMMARY

Here, we introduce a scheme for scalable integration of qubits based on spatially arrayed nodes of frequency-multiplexed multi-qubit registers. The approach uses the natural inhomogeneous distribution of optical transition frequencies observed in solid-state defect centers. This distribution enables spectrally selective, individual addressing of large numbers of artificial atom qubits within an optical diffraction-limited spot along a long cavity or waveguide. The spectral selection relies on frequency shifting an incident optical field. By electro-optic phase modulation, it is possible to turn on and off the desired spectral bands at a rate as fast as once per emitter lifetime (i.e., the reciprocal of the emitter lifetime), in principle allowing on the order of $10^9$ individual defect centers to be addressed per second when scanning in frequency and spatial dimensions across a diamond waveguide containing a high density of artificial atoms.

In our scheme for addressing qubits, the qubits can be spectrally multiplexed at arbitrary frequencies. Single photons emitted by the qubits at these arbitrary frequencies are converted to temporally multiplexed photons at the same frequency (e.g., the telecom output frequency of choice, the so-called quantum ITU frequency). Put differently, the spectral channels of the emitters can be given to us randomly by nature, and we can convert the random emitter spectral channels to common and useful spectral channels.

Our architecture greatly simplifies the production of large-scale quantum repeaters with thousands to millions of individually addressable qubits. Systems of such a size enable entanglement distribution at rates to realize long-sought applications of quantum networks. These applications include quantum secure communications, agreement protocols with privacy assuredness, distributed quantum computing, blind quantum computing, and distributed quantum sensing.

A spectrally multiplexed quantum repeater for a quantum network can include a frequency converter in optical communication with an ensemble of frequency-multiplexed qubits (e.g., defect centers in a solid-state host). Frequency-multiplexed qubits in the ensemble of frequency-multiplexed qubits have respective resonance frequencies (e.g., in the visible portion of the electromagnetic spectrum) distributed over an inhomogeneous band. The frequency converter converts single photons emitted by the frequency-multiplexed qubits at the respective resonance frequencies to single photons at a frequency in a telecommunications band (e.g., at or near a wavelength of 1550 nm).

The ensemble of frequency-multiplexed qubits can be disposed in a single-sided nanophotonic cavity or in a waveguide, such as a diamond waveguide or a slow-light waveguide having a bandgap detuned from the respective resonance frequencies. The frequency-multiplexed qubits can emit a first half of the single photons in a first direction and a second half of the single photons in a second direction, in which case there can be a reflector at one end of the waveguide to reflect the second half of the single photons in the first direction.

The ensemble of frequency-multiplexed qubits may be the first of several ensembles of frequency-multiplexed qubits at different sites in or along the waveguide. For instance, the spectrally multiplexed quantum repeater may include a second ensemble of frequency-multiplexed qubits at a second site in the waveguide with respective resonance frequencies distributed over the inhomogeneous band. In this case, the spectrally multiplexed quantum repeater may include a tuning mechanism, operably coupled to the waveguide, to shift the respective resonance frequencies of the first ensemble of frequency-multiplexed qubits with respect to the inhomogeneous band. In some examples, the waveguide is suspended from a substrate and the tuning mechanism is configured to deflect at least a portion of the waveguide.

The spectrally multiplexed quantum repeater can also include a first switch and a second switch. The first switch is in optical communication with the ensemble of frequency-multiplexed qubits and probes the frequency-multiplexed qubits at the respective resonance frequencies to produce the single photons at the respective resonance frequencies. And the second switch couples the single photons at the frequency in the telecommunications band to other nodes in the quantum network. The first and second switches can have switching speeds of 100 MHz to 1 GHz and at least 1 kHz, respectively.

The spectrally multiplexed quantum repeater can also include a laser, a modulator, and a nonlinear optical medium. In operation, the laser generates pump pulses at a pump frequency. The modulator, which is in optical communication with the laser, modulates sidebands onto the pump pulses at frequencies corresponding to the respective resonance frequencies of the frequency-multiplexed qubits. And the nonlinear optical medium, which is in optical communication with the modulator, convert the sidebands to the respective resonance frequencies of the frequency-multiplexed qubits for interacting with the frequency-multiplexed qubits.

The present technology also includes methods of distributing quantum signals over a quantum network. These methods may include switching pulses among spectrally multiplexed qubits in an ensemble of spectrally multiplexed qubits in a first node of the quantum network. These pulses cause the spectrally multiplexed qubits to emit spectrally multiplexed quantum signals, which are converted to temporally multiplexed quantum signals at a telecommunications frequency that can be locked to a reference frequency. A switch or other device directs the temporally multiplexed quantum signals from the first node to other nodes in the quantum network.

Switching the pulses among the spectrally multiplexed qubits may include generating the pulses at respective visible frequencies, in which case the spectrally multiplexed quantum signals can be at the respective visible frequencies too. The pulses can be switched among the spectrally multiplexed qubits at a rate of 100 MHz to 1 GHz. And the temporally multiplexed quantum signals can be switched at a rate of at least 1 kHz.

Switching the pulses may include generating pump pulses at a pump frequency, modulating sidebands of the pump pulses at frequencies corresponding to the frequencies of the spectrally multiplexed quantum signals, and mixing the sidebands with pulses at the telecommunications frequency to yield the pulses at frequencies of the spectrally multiplexed quantum signals. In some case, the ensemble of spectrally multiplexed qubits is a first ensemble of spectrally multiplexed qubits, and the method further includes tuning resonance frequencies of the spectrally multiplexed qubits in the first ensemble of spectrally multiplexed qubits with respect to resonance frequencies of spectrally multiplexed qubits in a second ensemble of spectrally multiplexed qubits.

An inventive spectrally multiplexed quantum repeater can also include a waveguide, modulator, spectrally multiplexed defect centers, first and second lasers, and first and second frequency converters. The spectrally multiplexed defect centers are in optical communication with a mode guided by the waveguide and are resonant at respective visible frequencies. The first laser to generates pump pulses at a pump frequency. The modulator, which is in optical communication with the first laser, modulate sidebands onto the pump pulses at frequencies corresponding to the respective visible frequencies of the spectrally multiplexed defect centers. The second laser generates a laser beam at a telecommunications frequency. The first frequency converter, which is in optical communication with the modulator, the second laser, and the spectrally multiplexed defect centers, mixes first portions of the sidebands with the laser beam to produce pulses at the respective visible frequencies. These pulses caused the spectrally multiplexed defect centers to emit spectrally multiplexed quantum signals at the respective visible frequencies. And the second frequency converter, which is in optical communication with the modulator and the spectrally multiplexed defect centers, mixes second portions of the sidebands with the spectrally multiplexed quantum signals to produce temporally multiplexed quantum signals at the telecommunications frequency.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 10A illustrates a first protocol for generating entanglement between two quantum memories within a single EMR. A laser tuned to the mean frequency $\omega_L$ of two emitters is modulated, producing sidebands that are resonant with both emitters. Interaction with the EMR induces the conditional emission of two photons. Passing this through a second modulator probabilistically interferes these two emissions, such that detection of a single photon at the original laser frequency $\omega_L$ can herald entanglement between the two memories, as described in the main text.

FIG. 10B illustrates a second protocol for generating entanglement between two quantum memories within a single EMR. This second protocol uses frequency beam splitters, permitting a 2-fold increase in the success probability of the protocol. Here, the frequency beam splitter performs a Hadamard gate on the two frequency modes of interest, interfering the two modes unconditionally.

DETAILED DESCRIPTION

1. Introduction

Figure 1:
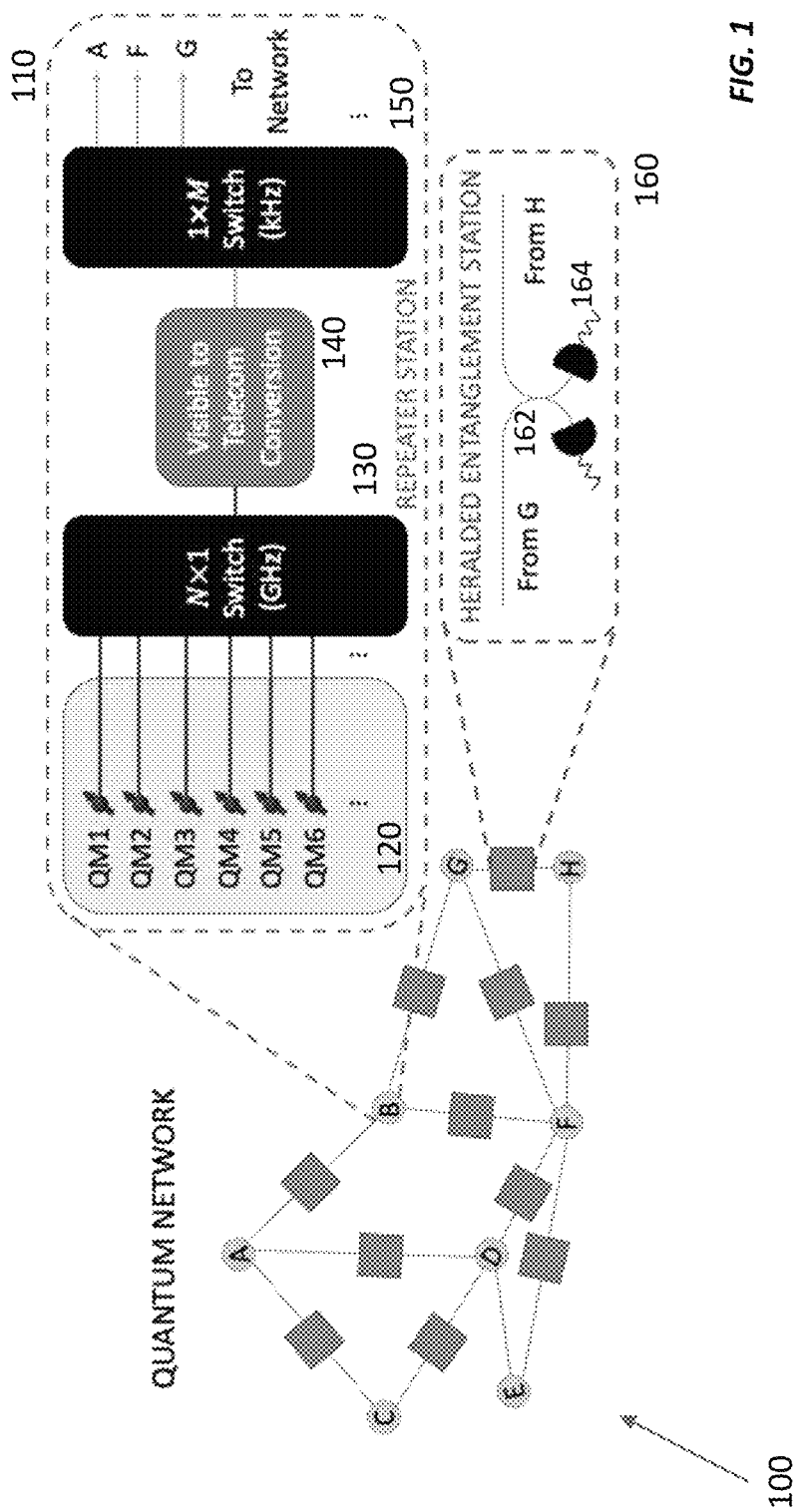
FIG. 1 shows a quantum network that includes a graph of spectrally multiplexed quantum repeaters (SMuQRs), each of which contains a bank of quantum memories used to distribute entanglement across the network.

FIG. 1 shows a schematic of a quantum network 100, with multiple spectrally multiplexed quantum repeaters (SMuQRs) 110, also called repeater station nodes, repeater stations, repeater nodes, or simply nodes, connected via telecom fiber links. These SMuQRs are labeled as nodes A-H in the graph at left in FIG. 1. Each pair of SMuQRs 110 is connected by a corresponding heralded entanglement station 160. The SMuQRs 110 and heralded entanglement stations 160 can be connected to each other via optical fiber and can communicate with each other via signals at telecommunications wavelengths (e.g., in bands near 850 nm, 1300 nm, or 1550 nm).

Each SMuQR 110 includes a number of elements, starting with a bank of quantum memories (QM1-QM6) 120, each resonant at a different wavelength, with optical access for distributing quantum states and thus entanglement across the network 100. The rate at which a single memory 120 can be used to attempt entanglement generation is hampered by overhead time required for memory control and readout rather than the capacity of the optical channel used for generating entanglement. As a result, overall entanglement rates can be increased by increasing the channel usage via multiplexing. As shown in FIG. 1, N memories 120 can be multiplexed using one or more switches 130 between the memories 120 and the output channel (where N is an integer greater than 1). This N×1 switch 130 should operate at speeds commensurate with the bandwidth of the quantum memories 120, which is typically on the 100 MHz to 1 GHz scale.

The quantum memory banks in different SMuQRs can be multiplexed over different frequencies, with the lasers used to probe the quantum memories locked to a common reference to account for the frequency offsets. For example, the defect centers in each SMuQR (node) can be spread across different sets of transition frequencies, with each node precharacterizing its emitters to determine the transition frequencies of its defect centers. In operation, at a given time step (communication time bin), two nodes can each address their first emitter (e.g., for node A this could be at some frequency $\omega_{1A}$, and for node B this could be at some frequency $\omega_{1B}$). These are likely different frequencies, but the frequency conversion process can be calibrated ahead of time to convert them to a common telecommunications frequency $\omega_T$ as long as nodes A and B share a common reference.

The quantum memories 120 can be implemented as solid-state quantum emitters, including the nitrogen and silicon vacancy centers in diamond, vacancies in silicon carbide, vacancies in silicon, and quantum dots. The relevant optical transitions for these artificial atoms are at visible wavelengths, so quantum memories 120 implemented as solid-state defect centers typically emit (and absorb) visible photons. As a result, after the N×1 switch 130, a frequency converter 140 converts the visible signals from the artificial atoms (quantum memories 120) to infrared wavelengths in order to reduce losses in the fiber optic channel of the network 100.

Another switch 150 controls the connectivity between this repeater node (SMuQR 110) and the neighboring M repeater nodes on the network 100, where M is an integer greater than 1. This 1×M switch 150 may operate at speeds of 1 kHz or higher. This is an order of magnitude higher than the decoherence rates of the quantum memories 120, which are typically on the 10-100 Hz scale. Each SMuQR 110 interfaces rapidly (e.g., at GHz rates) with each of its N memory banks 120 and switches more slowly (e.g., at kHz rates) among its M neighbor repeater nodes (the other SMuQRs 110 in the network).

Each pair of nodes (SMuQRs 110) is connected via a corresponding heralded entanglement station 160. Each heralded entanglement station 160 receives photonic emissions from its pair of SMuQRs 110 and performs a Bell State Measurement on those photonic emissions. In doing so, the heralded entanglement station 160 heralds generation of entanglement across the link between the pair of SMuQRs 110. As shown in FIG. 1, the heralded entanglement station has a 50:50 beam splitter 162 that overlaps the photonic emissions from two repeater stations (e.g., SMuQRs 110 at nodes G and H) for detection by a pair of photodetectors 164. This constitutes a Bell state measurement such that a click (detection) at a heralded entanglement station 160 heralds the generation of entanglement between the two repeater nodes it links.

A common approach for the implementation of the fast N×1 switch is spatial mode multiplexing (SMM). However, SMM can be difficult for a large number of qubits as explained below. Here, we introduce a scheme to address large numbers of individual spin qubits that serve as the single photon emitter and the memory in one device. In addition, by strain control of defect centers, we can dynamically address individually selected defect centers.

2. Spectrally Multiplexed Quantum Repeater (SMuQR)

2.1 Multiplexed Optical Addressing Assisted by a Nanophotonic Waveguide

Here, we disclose using the naturally large inhomogeneous distribution of optical transitions in solid-state artificial-atom quantum memories 120 for spectral instead of spatial multiplexing to realize a fast effective N×1 switch 130. These quantum memories 120 comprise artificial-atom qubits, where the artificial atom can be a defect center, quantum dot, rare-earth ion defect, organic molecule, single-photon emitter in a 2D material or carbon nanotube, etc. Here, we focus on defect centers (and more specifically color centers) in diamond.

Figure 2:
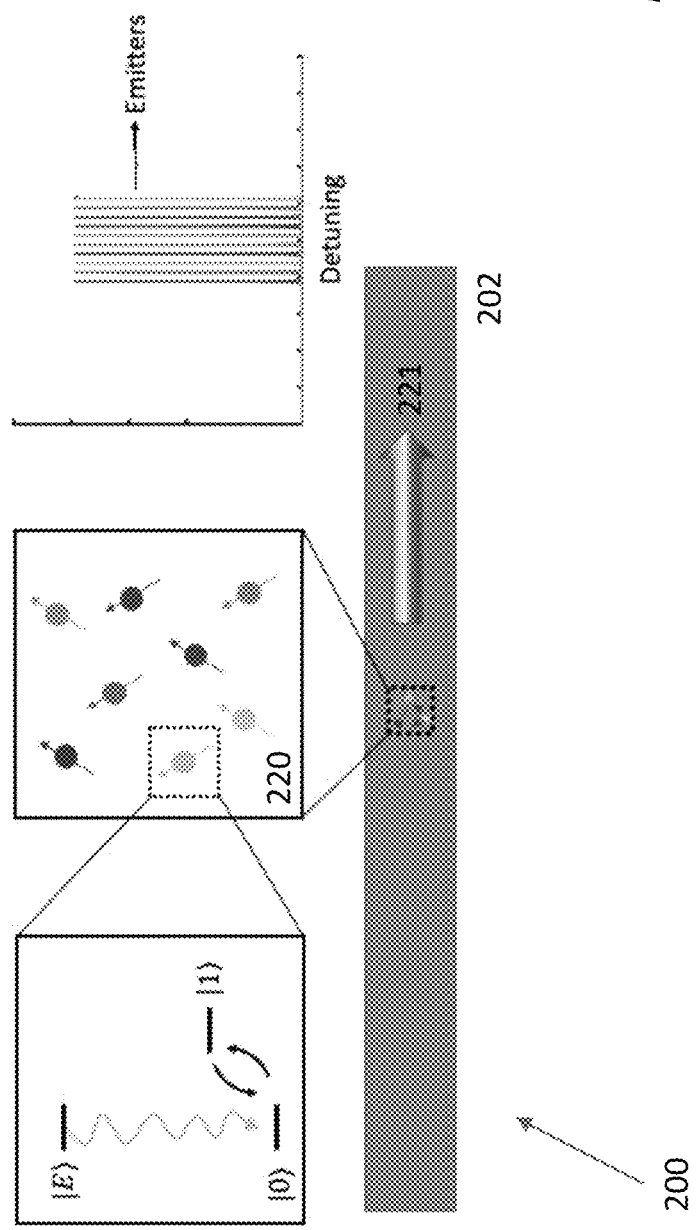
FIG. 2 illustrates a base unit for one of the SMuQRs in the network of FIG. 1.

FIG. 2 shows a base unit 200 for a SMuQR 110 with an ensemble of solid-state defect centers (e.g., on the order of $10^6$ nitrogen vacancies) 220 that are co-located within the mode volume of a nanophotonic waveguide 202, here fabricated out of the host material (e.g., diamond). Each defect center 220 hosts a spin degree of freedom (indexed $|0\rangle$, $|1\rangle$) and a spin-conserving optical transition and can therefore act as a quantum memory. Due to minute differences in the local environments of the defect centers 220, these optical transitions are spectrally distinct from one another. Dipole emissions 221 of the defect centers 220 are coupled into a common single spatial mode of the waveguide 202, which guides them to other parts of the network via a 1×M switch (not shown).

The defect centers 220 can exhibit individual optical transition frequencies that are split by over an order of magnitude more than their natural linewidth as shown in the detuning plot at upper right in FIG. 2. Addressing the defect centers 220 with a modulated laser, tunable laser, or laser array (not shown) thus provides an effective N×1 switch in the frequency domain, where N is the number of defect centers. This N×1 switch can be fast, e.g., GHz rates, when implemented using a laser modulated by an electro-optic modulator, with a speed limited only by the modulator electronics. The end result is a SMuQR for high-rate data transmission in a quantum network.

2.2 Multiplexed Optical Addressing in a Single-Sided Cavity

Figure 3:
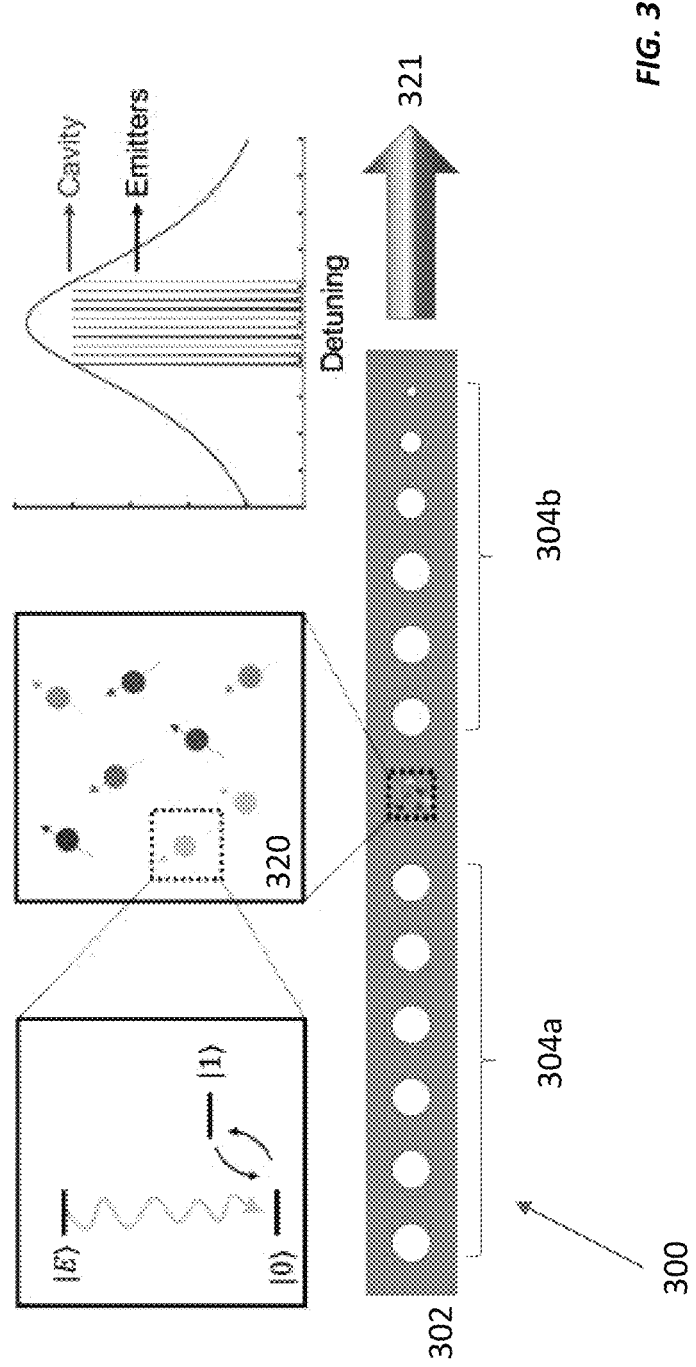
FIG. 3 shows a base unit for the SMuQR that employs a single-sided photonic crystal cavity instead of a waveguide to host the defect centers.

FIG. 3 shows an alternative SMuQR base unit 300 with an ensemble of defect centers 320 in a mode-field maximum of a single-sided nanophotonic cavity 302 defined by a full reflector 304a and an output coupler 304b rather than a waveguide. As shown in the detuning plot at upper right in FIG. 3, the linewidth of the nanophotonic cavity 302 is chosen to be more than an order of magnitude greater than the splitting among the defect centers 320, permitting multiple, individually addressable defect centers 320 to be simultaneously resonant with the nanophotonic cavity 302. This could slightly restrict the allowed bandwidth of emitters (defect centers 320) and increase fabrication requirements, but greatly enhances the efficiency of the spin-photon interface between the emitters 320 and the device mode via the Purcell effect, where the emission of the emitters 320 into the mode of interest is enhanced by the Purcell factor:

$$F_p = \frac{3}{4\pi^2}\left(\frac{\lambda}{n}\right)^3\left(\frac{Q}{V}\right),$$

where Q is the quality factor of the nanophotonic cavity 302, V is the mode volume, and $\lambda/n$ is the wavelength of light 321 emitted by the defect centers 320 in the cavity material. This enhancement in emissions correspondingly increases the efficiency of the SMuQR as well as the bandwidth of the individual emitters 320 themselves, resulting in higher entanglement rates per emitter 320.

2.3 Multiplexed Optical Addressing in a Slow-Light Waveguide

Figure 4:
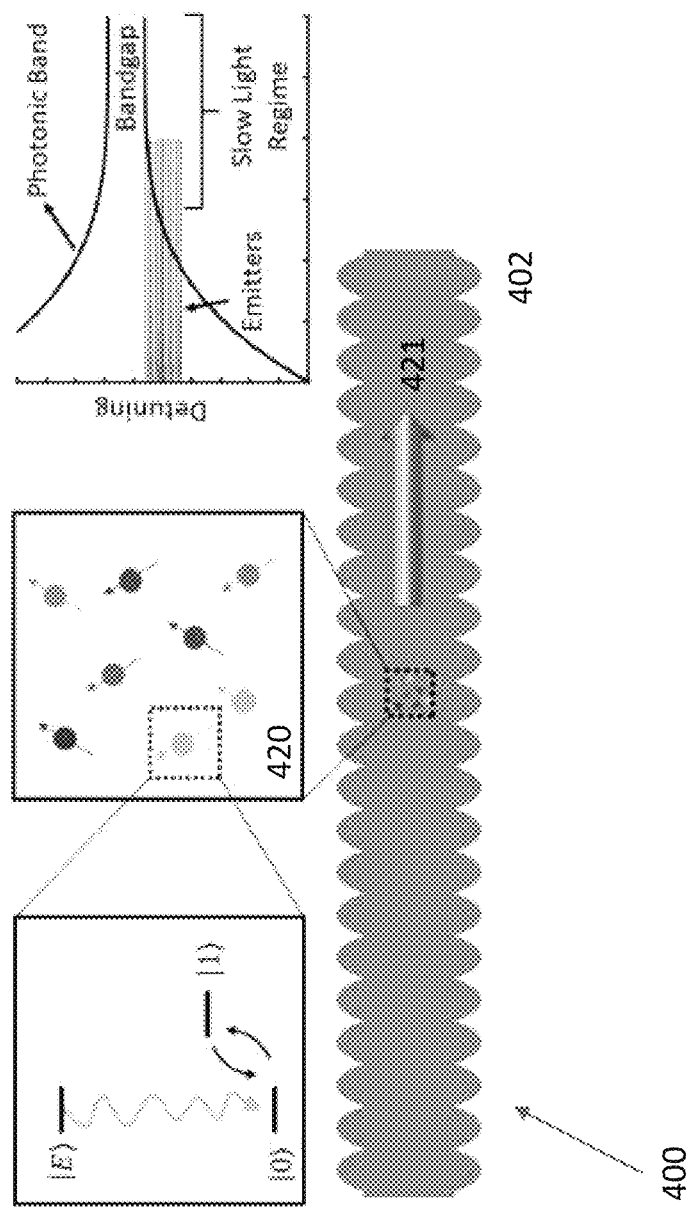
FIG. 4 shows a base unit for the SMuQR that employs a slow-light waveguide, where emitters near the bandgap are Purcell enhanced, increasing emission into the desired output mode.

FIG. 4 shows a base unit 400 for a SMuQR with an ensemble of defect centers 420 in a photonic crystal waveguide 402 with a bandgap that is detuned from the emitter emission frequencies as shown in the detuning plot at upper right. In this photonic crystal waveguide 402, the density of electromagnetic modes increases near—but not within—the bandgap due to the decreased group velocity. By Fermi's Golden Rule, an emitter 420 in this photonic crystal waveguide 402 experiences enhanced emission 421 into the waveguide mode, giving an effective Purcell enhancement equal to:

$$F_P = \frac{3\pi c^3}{A_{eff}\omega^2 \epsilon^{3/2} v_g},$$

where c is the speed of light, $A_{eff}$ is the mode cross-section area, $\omega$ is the angular frequency of the emission 421, $\epsilon$ is the relative electric permittivity of the material, and $v_g$ is the group velocity.

The detuning plot in FIG. 4 also shows the group velocity, which is determined by the slope of the photonic band $d\omega/dk$ of the photonic crystal waveguide 402. Near a bandgap, the slope of this band flattens out (right portion of the detuning plot), creating a strong Purcell enhancement for emitters 420 with resonances near but not in the bandgap. This Purcell enhancement increases the emission rate of the emitters 420 into the waveguide mode. Furthermore, the photonic crystal waveguide 402 can be engineered to enhance emission into a single direction by taking advantage of chiral topological modes, further increasing the efficiency with which light 421 can be collected from the emitters 420.

2.4 Protocol for Use in Quantum Networking

Like modern classical networks, quantum networks can take advantage of spectral multiplexing in order to increase communication rates. In the case of quantum repeater networks like the one in FIG. 1, the benefits offered by spectral multiplexing are even more dramatic due to the often narrow <100 MHz bandwidths of typical optically-active quantum memories. However, the use of many spectral channels often involves precision frequency distribution and synchronization in order to prevent distinct channels from erroneously overlapping with one another. Furthermore, many quantum communication protocols require optical frequencies to be stable within <1 MHz, which is a difficult constraint to meet simultaneously across many frequency channels.

A SMuQR can synchronize many multiplexed frequency channels over a quantum network. To do this, it can use nonlinear frequency shifting of a single stabilized laser and the natural inhomogeneous distribution of optical transition frequencies observed in solid state defect centers in order to realize spectral multiplexing. The SMuQR architecture greatly simplifies the challenging problem of frequency distribution across networks and reduces the resource requirements per quantum node.

Figure 5A:
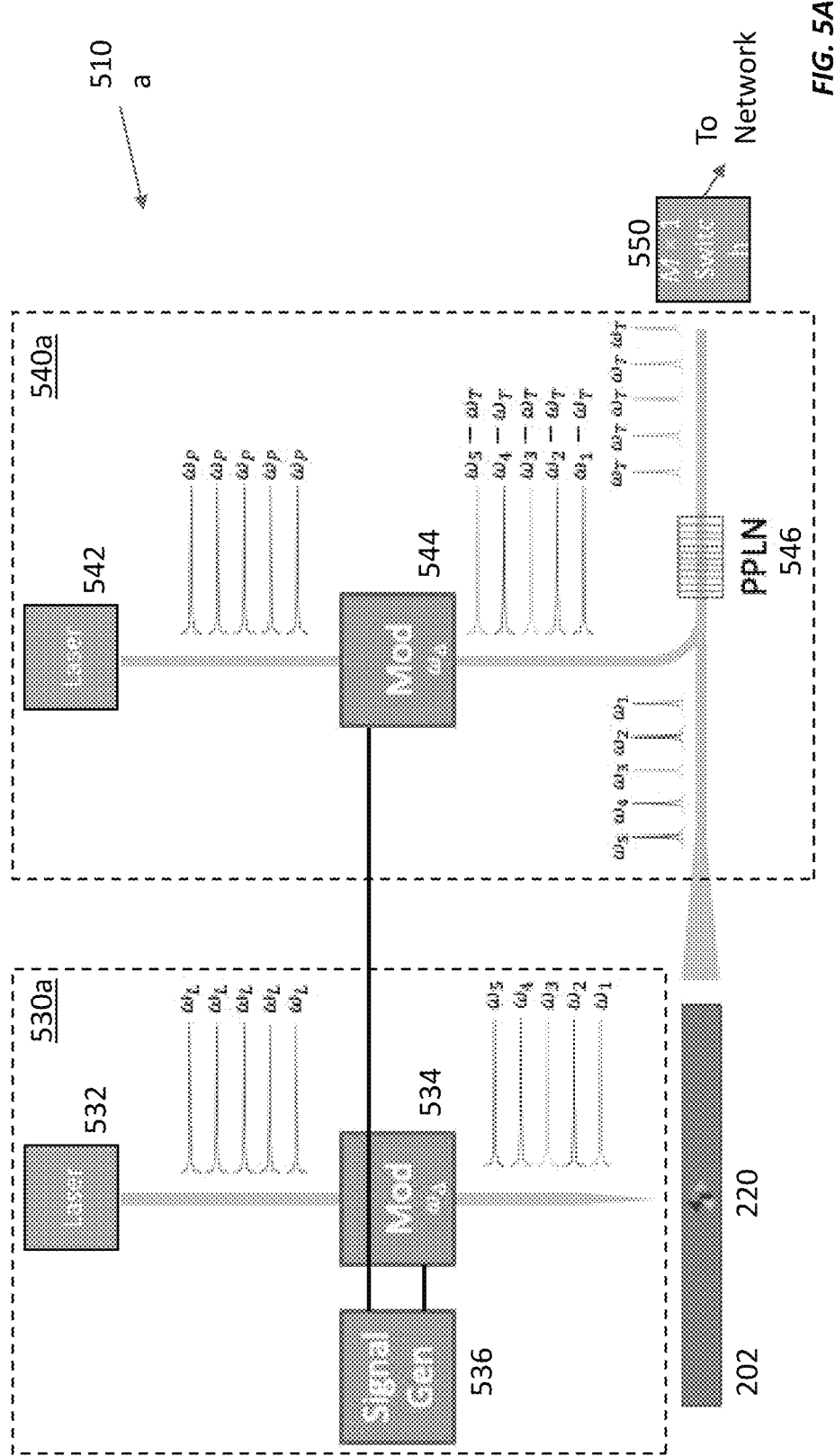
FIG. 5A illustrates a SMuQR with an N×1 switch that accesses the spectrally multiplexed qubits and converts the spectral multiplexing to time multiplexing with a frequency converter. Excitation pulses are modulated to be resonant with the transitions of individual defect centers within a nanostructure. The resultant emissions are passed through a nonlinear down-conversion device, such as a periodically-poled lithium niobate (PPLN) crystal, where they are pumped with a signal that is frequency modulated in complement to the modulation of the excitation beam. In this way, the outgoing pulses are at the same frequency, enabling networking on a common band.

FIG. 5A illustrates operation of a SMuQR 510a that includes a quantum memory in the form of an ensemble of N defect centers (quantum emitters) 220 in a solid-state waveguide 202 as in FIG. 2. The defect centers 220 have distinct transition frequencies in the set $S_\omega = \{\omega_1, \omega_2, \ldots \omega_N\}$. It also includes an N×1 switch 530a that addresses the defect centers 220, and a frequency converter 540a that converts spectrally multiplexed visible signals at wavelengths of $\omega_1, \omega_2, \ldots, \omega_N$ from the defect centers 220 into temporally multiplexed telecom-wavelength signals. A 1×M switch 530a directs the telecom-wavelength signals to other nodes in the network at kHz rates.

The N×1 switch 530a includes a laser 532, a single-sideband modulator (e.g., an acousto-optic modulator or electro-optic modulator) 534, and a radio-frequency (RF) signal generator 536. In operation, the laser 532 emits a laser beam at a frequency $\omega_L$, which either overlaps with or adjacent to the inhomogeneous band of the defect centers 220, which are usually resonant at visible wavelengths. This laser beam can be pulsed or continuous wave. The modulator 534 single-sideband modulates the laser beam at a detuning frequency $\omega_A(t)$ in response to control signals from the RF signal generator 536, which can generate signals at MHz or GHz rates, to produce a sideband at $\omega_L + \omega_A(t)$. This sideband is pulsed in intensity by the modulator 534 or by modulating the laser 532 and is then incident on the defect centers 220.

Varying as a function of time the detuning frequency and hence the sideband frequency makes it possible to address different defect centers 220 at different times. At time $t_1$, for example, the sideband frequency is $\omega_L + \omega_A(t_1) = \omega_1$, which is resonant with a first defect center 220, causing that defect center 220 to emit a single photon at a wavelength of $\omega_1$ into the optical mode of the waveguide 202. After the pulse, the modulation frequency $\omega_A$ is shifted such that $\omega_L + \omega_A(t_2) = \omega_2$, and the pulsed excitation is repeated, such that this time a second defect center 220 is uniquely induced to emit a single photon at a wavelength of $\omega_2$ into the optical mode of the waveguide 202. This process can be repeated for up to all N quantum emitters 220. The output of the quantum emitters 220 is thus a train of spectrally distinguishable single photons at wavelengths $\omega_1, \omega_2, \ldots, W_N$, all contained within a single spatial mode of the waveguide 202.

The frequency converter 540a converts this train of spectrally distinguishable single photons into a train of spectrally indistinguishable single photons at a single telecommunications frequency ($D_T$ using a pump laser 542, another single-sideband modulator (e.g., another acousto-optic modulator) 544, and a nonlinear crystal 546. The pump laser 542 emits strong pulses (e.g., about 100 mW) at a frequency $\omega_P$, which is typically in the telecommunications band. The modulator 544 modulates these pulses at the same time-varying modulation frequency $\omega_A(t)$ applied to the other modulator 534 from the RF signal generator 536 to produce a train of sideband pulses at the sideband frequency of $\omega_P + \omega_A(t)$. This modulation frequency varies in time, synchronized with the frequencies traveling in the device photon train. In other words, the modulation frequency $\omega_A(t_n)$ is chosen so that $\omega_T + \omega_P + \omega_A(t_n) = \omega_n$, where $n = 1, 2, 3, \ldots$. At time $t_1$, for example, $\omega_T + \omega_P + \omega_A(t_1) = \omega_n$, such that the sideband frequency is $\omega_1 - \omega_T$.

The sideband pulses are multiplexed with the spectrally distinguishable train of pulses from the switch 530a and passed into the nonlinear crystal 544, which made of periodically poled lithium niobate (PPLN). The nonlinear crystal 544 facilitates difference-frequency generation between the device photon at $\omega b_n$ and the sideband pulse at $\omega_n - \omega_T$. This converts the photons at $\{\omega_1, \omega_2, \ldots, \omega_N\}$ from the quantum emitters 220 to photons at a common telecommunications frequency $\omega_T$, regardless of the initial starting frequency.

The SMuQR 510a in FIG. 5A uses a frequency conversion scheme to relax frequency distribution requirements and to reduce the resources per node. The laser 532 at a central frequency $\omega_L$ is modulated to create sidebands at the resonant frequencies $\omega_n$ of the defect centers 220. While this suffices for performing gates on individual defect centers, quantum gates between two or more defect centers use photons at degenerate frequencies. The photons from the defect centers 220 are then shifted to a common telecommunications frequency ($D_T$ for quantum networking.

For communication between separated nodes, this final conversion step shifts photons to a frequency $\omega_T$ that is common across the network. While the pulses from the pump laser 542 used for frequency conversion, being at a telecom frequency $\omega_P$, can be distributed over long distances via optical fiber, the laser beam from the visible laser 532 used for qubit addressing cannot, creating a challenge for performing high-fidelity gates between separated quantum nodes.

Figure 5B:
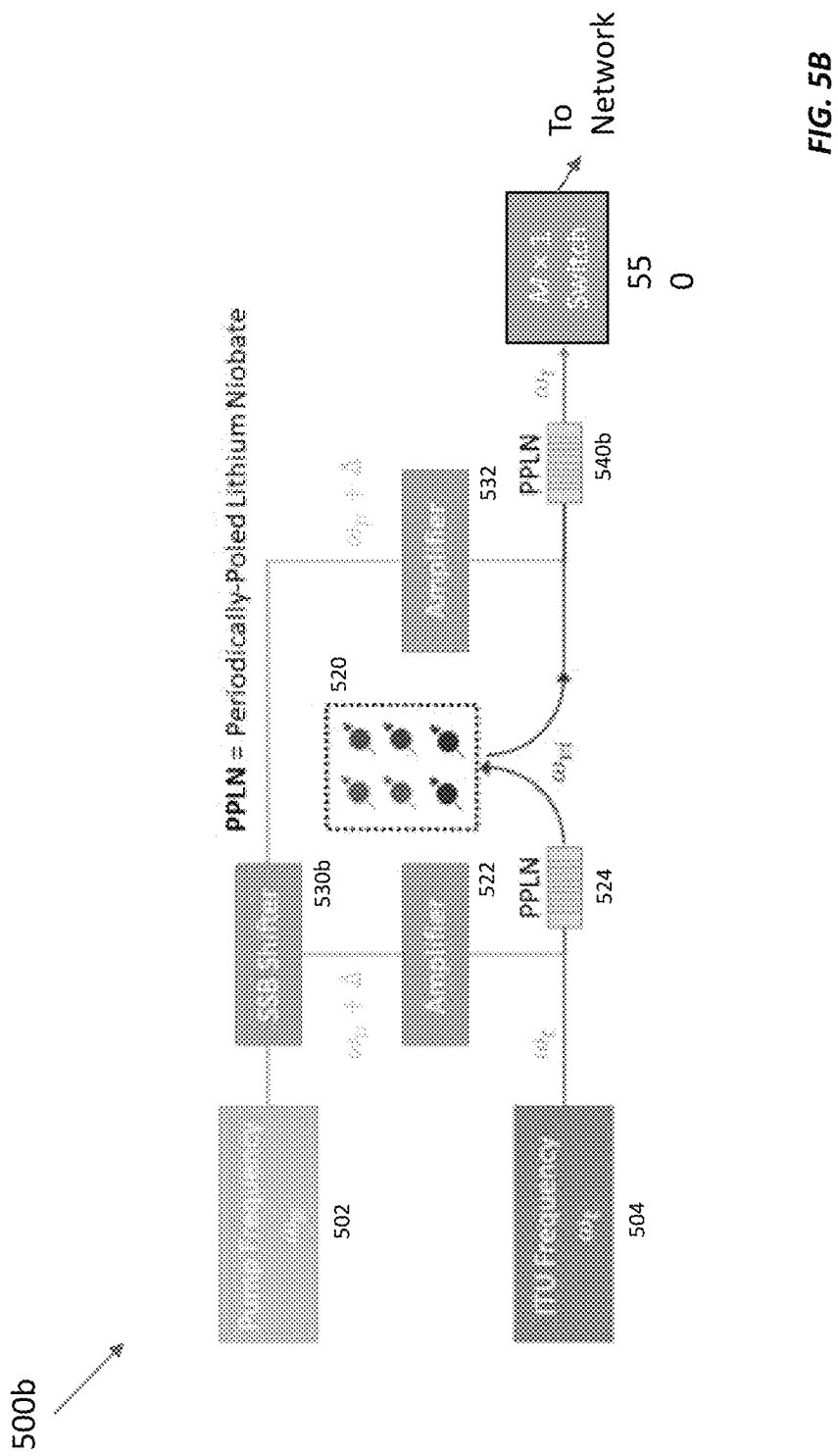
FIG. 5B illustrates a SMuQR with an N×1 switch that accesses the spectrally multiplexed qubits and converts the spectral multiplexing to time multiplexing using a frequency-locked source and a pair of frequency converters.

FIG. 5B shows a SMuQR 510b that converts spectrally multiplexed, visible photons from quantum emitters into temporally multiplexed photons at a common telecommunications wavelength without a visible laser. Instead, the SMuQR 510b uses two lasers that operate at telecommunications wavelengths: (1) a pump laser 502 that emits pulses at a frequency of $\omega_P$ and (2) a telecommunications laser 504 that emits a pulsed or continuous-wave laser beam at a common frequency of $\omega_T$. These lasers 502 and 504 can be locally stabilized lasers in the SMuQR 510b or elsewhere in the network and coupled to the SMuQR 510b via optical fibers. The SMuQR 510b also includes a quantum memory 520 (e.g., defect centers in a waveguide or cavity like those in FIGS. 2-4), a fast N×1 switch 530b in the form of an RF-modulated single-sideband (SSB) modulator (e.g., an acousto-optic modulator), a frequency converter 540, and a slower 1×M switch 550b that directs photons at $\omega_T$ to other nodes in the network.

The SMuQR 510b operates as follows. The telecommunications laser 504 emits a signal at $\omega_T$, the agreed-upon frequency at which quantum information is transported throughout the network. This is the quantum networking equivalent of the classical internet's ITU grid. At the same time, the pump laser 504 emits a pump pulse at $\omega_P$. The fast switch 530b modulates the pump pulse to produce a sideband at $\omega_P + \Delta(t_n)$, where $\Delta(t_n)$ is a time-varying detuning based on the resonant frequencies of the qubits in the quantum memory 520. An optical amplifier 522 amplifies the sideband pulse and couples it into a PPLN chip 524 with the signal from the telecommunications laser 504. Frequency upconversion in the PPLN chip 524 results in a coherent signal at the desired qubit frequency $\omega_n = \omega_T + \omega_P + \Delta(t_n)$, which may be outside the telecommunications band (e.g., it may be in the visible region of the electromagnetic spectrum).

The coherent signal interacts with a qubit (e.g., a defect center or other quantum emitter) in the quantum memory 100, which emits a quantum signal at $\omega_n$. The quantum signal undergoes frequency downconversion in the frequency converter 540b, which can be implemented as another PPLN chip, facilitated by the same frequency-shifted pump signal at $\omega_P+\Delta(t_n)$ from the pump laser 502 and fast switch 520b used for upconversion. This frequency-shifted pump signal may be amplified by another optical amplifier 532 before being coupled into the frequency converter 540b. Upconversion yields a temporally multiplexed signal at the quantum ITU frequency $\omega_T$, which is directed to other nodes in the network via the slower switch 550. In this way, the final outgoing signal is locked to the quantum ITU frequency $\omega_T$, regardless of any drifts or noise in the pump laser's frequency $\omega_P$ or the transition frequencies $\omega_n$ of the spectrally multiplexed qubits in the quantum memory 520.

For the SMuQR 510b to operate properly, the resonance or transition frequencies $\omega_n$ of the spectrally multiplexed qubits should be characterized for each node. Once characterized, these frequencies should be stable to within the linewidth of the transition frequency. Linewidths vary based on the qubit type and can range from 10 MHz for nitrogen vacancy qubits to 100 MHz for silicon vacancy qubits. In addition, the absolute frequency of the pump laser 502 should be stable to within the linewidth of the SMuQR transition frequencies, such that the equation $\omega_n=\omega_T+\omega_P+\Delta(t_n)$ holds over time. The frequency of the telecommunications laser 504 should also be stable to within the requirements of the quantum networking protocol. For emission-based protocols such as that proposed by Barrett and Kok, this is set by the transition linewidth of the quantum memory 520. For absorption-based protocols such as that proposed by Duan and Kimble, this may depend on the precise implementation, but can be as low as 100 kHz for some implementations.

There are at least two ways to ensure the frequency stability of the telecommunications laser 504. First, the telecommunications laser 504 can be frequency-locked to a frequency reference, such as an ultra-low expansion reference cavity (not shown). Such cavities are engineered to be thermally and mechanically isolated from their environment, such that the resonant frequency of the cavity is stable to within 1 kHz over the course of many months. A reference cavity could be placed at each quantum node (SMuQR 510b) and calibrated once only every few months or more depending on stability requirements. In this case, the telecommunications laser 504 at each node (SMuQR 510b) could be stabilized to the cavity without additional stabilization or frequency distribution for many months at a time.

Figure 5C:
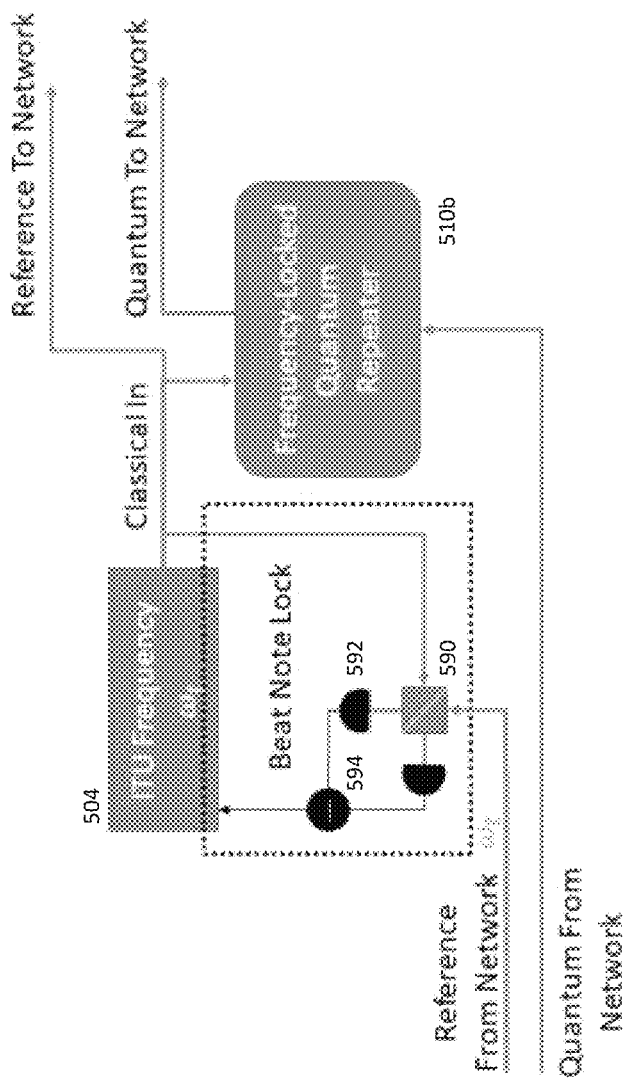
FIG. 5C illustrates frequency-locking the source in the SMuQR of FIG. 5B to a reference distributed throughout the network.

FIG. 5C shows a second approach to stabilizing the telecommunications laser 504. This involves distributing a reference laser beam throughout the network. As shown in FIG. 5C, each network node has at least two input channels: one for quantum signals, and another for a classical reference signal at the ITU frequency $\omega_T$. A beam splitter 590 mixes the reference signal with the locally generated telecommunications signal from the telecommunications laser 504. A differential photodetector 592 generates a beat note from the outputs of the beam splitter 590. Stabilization circuitry 594 uses this beat note to lock the output of the local ITU laser 504 to the reference laser beam. The local laser 504, now stabilized to the reference, can be used (1) locally for addressing the frequency-locked quantum repeater 510b as described above with respect to FIG. 5B, and (2) remotely as a reference for the next node in the network. In this way, an entire chain of quantum repeaters can be stabilized to one another.

If the quantum emitters 220 are long-lived memories, such as diamond color centers, the protocols in FIGS. 5A and 5B can be used to generate a train of spin-photon entangled states. In this case, before being addressed by the excitation laser, each memory is initialized into a superposition state $|\psi\rangle=(|0\rangle+|1\rangle)/\sqrt{2}$. As shown at upper left in FIG. 2, only the $|0\rangle$ state exhibits a permitted transition to an excited state $|E\rangle$, and as such, only the component in the $|0\rangle$ state may emit a photon. This results in an entangled spin-photon state:

$$|\psi\rangle = (|01\rangle + |10\rangle)/\sqrt{2}$$

where the first term in each state vector refers to the state of the memory, and the second term refers to the number of photons emitted. This state may then be used for entanglement distribution protocols such as those proposed by C. Cabrillo et al., Physical Review A 59, 1025 (1999) or S. D. Barrett and P. Kok, Phys. Rev. A 71, 060310 (2005), each of which is incorporated herein by reference in its entirety.

With this scheme, two nodes in a quantum network can agree upon a telecommunication wavelength $\omega_T$, then each proceed to rapidly produce single-photon pulses for use in establishing entanglement with each other.

2.5 Limitations and Possible Solutions

The specification above describes how to spectrally and temporally multiplex a single spatially localized cluster of defect centers. The number of defect centers that can be multiplexed in this fashion is limited by the finite ratio of the inhomogeneous distribution of emitter frequencies to the emitter linewidth. These numbers vary from emitter to emitter as described below. However, this limitation can be overcome by increasing the bandwidth of the inhomogeneous distribution of the emitters. Methods for increasing the inhomogeneous bandwidth include:

1) Changing the material strain, for example, by depositing straining layers such as tensile SiN, selective oxidation, etc.;
2) Geometrically defining strain relaxation by suspending areas with different lengths using, for example, double-clamped beams, leads to controllable steps of strain, proportional to the released length. The initial strain of the material can be further engineered by global strain tuning, for example, by using a piezo-electric substrate or macroscopic mechanical bending;
3) Creating additional defects that are optically inactive at the wavelength of the emitter of interest in the host material via electron or ion irradiation, which change the inhomogeneous distribution via electric or strain field interactions; or
4) Creating strain via laser irradiation, for example, by local ablation or other laser-induced damage in the host material.

3. Endlessly Multiplexed Repeater (EMR)

Figure 6:
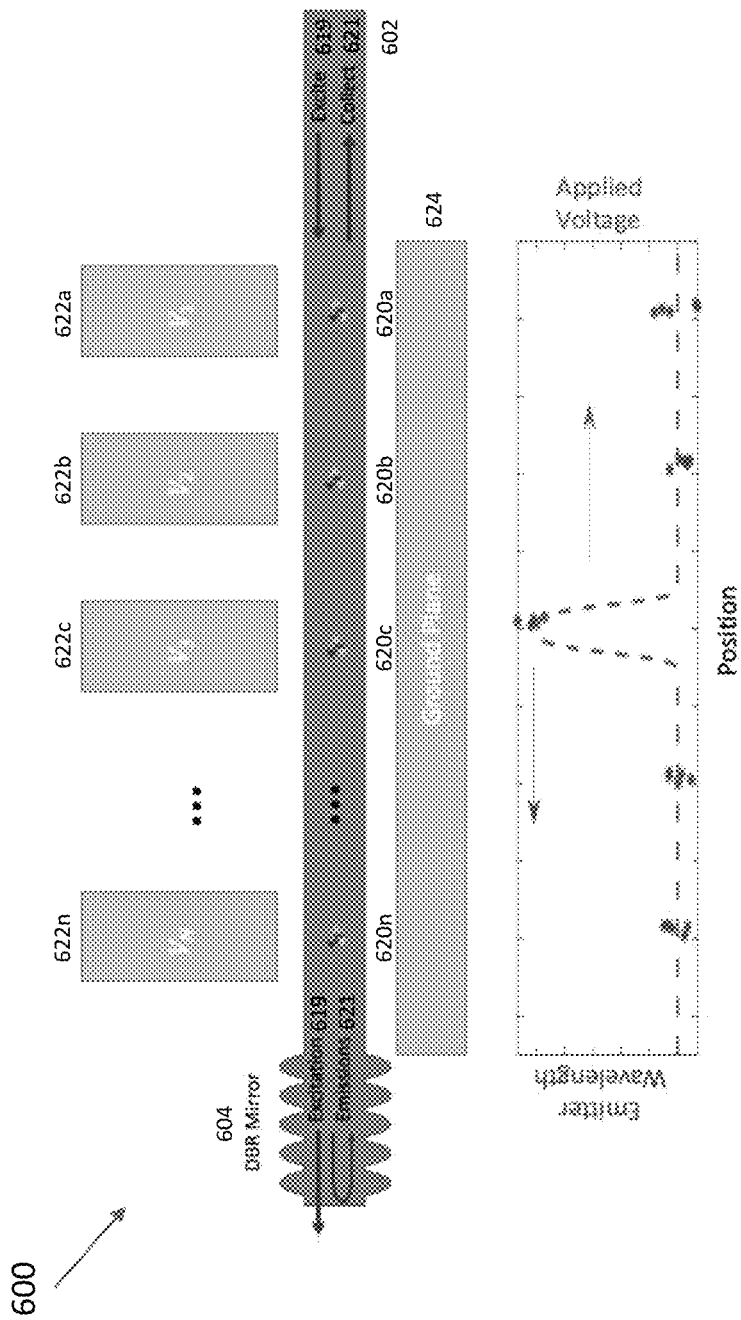
FIG. 6 illustrates multiplexing multiple defect center clusters within a single waveguide using active tuning. Arrays of defects are implanted into a single waveguide at sites adjacent to respective electrodes. Applying voltage to a single electrode tunes the transition frequencies of a class of defects at the site corresponding to that electrode, uniquely bringing that site into resonance with an excitation laser (here input into the waveguide from the right side). This induces single-photon emissions from the array of defects at the corresponding site, leaving the defects at the other sites unperturbed due to their being off-resonance. Emissions into the righthand travelling mode are collected directly; emissions into the left travelling mode are reflected off of a distributed Bragg reflector (DBR) to improve collection efficiency. The polarization of the input laser is adjusted for maximal transmission through the DBR, allowing efficient isolation (e.g., on order 20 dB) of the excitation from the emissions.

FIG. 6 shows an architecture for overcoming the limitations of the SMuQR approach by cascading multiple clusters of defect centers 620a-620n (collectively, defect centers or quantum emitters 620) within a single device. This device is called an endlessly multiplexed repeater (EMR) 600 and is not limited by the defect characteristics. The EMR 600 can replace the defect centers 220, 320, and 420 and waveguide 202, cavity 302, and slow-light waveguide 402 in FIGS. 2-4, respectively. In an EMR 600, emitters 620 are implanted in a common waveguide 602, but in clustered locations along the waveguide's length. The locations or sites are far enough apart to prevent cross-talk between adjacent sites (e.g., about 1 micron apart) and are distinctly addressable by respective tuning elements 622a-622n fabricated adjacent to the waveguide 602, with one tuning element 622 per ensemble of emitters 620. As explained below, the tuning elements 622 provide local tuning with little to no cross-talk, induce spectral shifts that are larger than the native inhomogeneous distribution of the emitters 620, and permit the emitters 620 of interest to be coupled to the same output optical mode. If desired, each site can be permanently or statically strained or subject to a static voltage to produce static shifts in the inhomogeneous distributions of the emitters 620.

Actuating an individual site's tuning element 622 shifts the resonance wavelengths of the emitters 620 located at that site. The magnitude and direction of the shift depends on a number of factors that can be used to divide the emitters into distinct classes, including the orientation of the emitter 620 and its precise location within the waveguide 602. Since the defects 620 have different orientations, they may react differently under strain actuation. This means that some of them may redshift and some others may blueshift, potentially changing the inhomogeneous distribution. As such, activation of the tuning element 622 does not in general uniformly shift all of the emitters 620 at that site, but rather cause their resonances to spread out based on their class. A tuning element 622 can fine-tune the strain to reduce degeneracy in individual clusters of emitters 620, for example, or potentially to change with the inhomogeneous distribution.

Without being bound by any particular theory, the strain on each emitter can be divided into two categories: (1) axial (strain along its axis) and (2) transverse (strain perpendicular). Furthermore, each emitter has many transitions, not just one. Axial strain shifts all of the emitter transitions up or down in frequency, depending on if the strain is compressive or expansive. Transverse strain affects different transitions differently, shifting some up and some down. So, for a given transition, applied strain can have axial and transverse components. The sum of these two effects determines how the transition shifts on the whole. The center frequency of the transition may shift if on average the transverse and axial shifts are the same sign for most of the emitters. An applied strain can also increase the inhomogeneous linewidth, i.e., it can increase the bandwidth over which the transition frequencies in the cluster of emitters are distributed.

For the EMR 600 it suffices to optimize tuning to consider only one class of emitters 620; these emitters 620 are tuned maximally away from the central inhomogeneous distribution and can thus exhibit resonances that are unique along the length of the waveguide 602. The other classes of emitters 620 are unused, though the future inclusion of additional tuning degrees of freedom might permit uniform tuning of all classes of emitters.

FIG. 6 shows the tuning of the emitters 620 of interest schematically, as an example in which the tuning elements 622 function via application of a voltage, with a common ground 624 on the opposite side of the waveguide 602. With no tuning applied, while emitters 620 within a single cluster may be individually addressable, the finite inhomogeneous distribution of emitter transitions means that a given emitter 620 within a cluster is likely degenerate with an emitter 620 in another cluster somewhere along the waveguide 602. Applying a pre-characterized tuning to a single electrode 622 shifts the transition frequencies of defects 622 at the corresponding site along the waveguide 602 away from the central distribution. This removes the degeneracies between the emitters 620 in this site and emitters 622 at other sites along the waveguide 602, allowing the emitters 620 in this site to be addressed individually.

In this case, an excitation pulse 619 can be introduced in the waveguide mode directly (right side in FIG. 6), in the same spatial mode as emissions 621 of the excited defect center 620. This provides a single point of entry for the qubits 620 at every cluster in the EMR 600, which is much simpler than in other architectures, which have a unique optical access point for each qubit. A distributed Bragg reflector (DBR) 604 at the opposite end of the waveguide 602 transmits unabsorbed excitation light 619 and reflects emissions 621 back toward the input port. As a result, the defect center emissions 621 can be collected from the same port as the excitation 619 is introduced, which enables good isolation between the excitation laser (not shown) and the single photon defect emissions 621. After the defects 620 have been addressed, the tuning at this site is reduced to zero, and the process can be repeated at the next site.

To reduce the impact of tuning on device rate, a cascaded tuning scheme can be used, where adjacent sites operate at different target wavelengths. As such, the slow (e.g., 1 ms time scale) process of tuning emitters at one site (e.g., 620b) into resonance can be started during the access time period of a nearby site (e.g., 620a) with little to no crosstalk.

4. Tuning Mechanisms

The emitters' transition frequencies can be tuned using Stark shifts, piezo-electric strain tuning, capacitive strain tuning, or other strain tuning techniques. For non-inversion symmetric defect centers, such as nitrogen vacancy centers in a waveguide, the application of an electrical potential across the waveguide as depicted in FIG. 6 induces a direct current (DC) Stark shift on the centers. In this case, electrodes alone are thus sufficient to tune the defect centers at the individual sites.

Applying strain shifts the spectral transitions of both inversion symmetric and non-inversion symmetric defect centers. Piezo-electric strain tuning is based on strain in the defect induced by a piezoelectric material. This can be achieved by monolithic integration, where the piezoelectric material is grown or deposited, or by hybrid integration, where the piezoelectric material is transferred. In the case of monolithic integration, the piezoelectric material can be grown or deposited on the emitter host material near the site of the emitter; alternatively, the emitter host material can be grown or deposited onto a pre-fabricated piezoelectric stack. In the case of hybrid integration, the piezoelectric material may be grown separately before being transferred onto the emitter host material near the site of the emitter, or vice versa.

For example, a layer of a piezo-electric material, such as aluminum nitride (AlN), can be sputtered in thin films directly onto an emitter-containing diamond device. AlN is optically transparent at visible wavelengths, such that this is compatible with low-loss waveguides and high-performance cavities. The application of a voltage across adjacent electrodes, which may or may not be in direct contact with the piezoelectric film, strains the piezo-electric material and thus strains the underlying diamond layer, tuning the defect centers at an individual site.

Capacitive strain tuning is based on the force generated between two charged surfaces in proximity, which form a capacitor. Depending on the choice of capacitor geometry, capacitive tuning enables application of strain in several directions, and strain gradients via excitation of axial, flexural, or torsional mechanical modes. The origin of these forces may be (1) an electric potential applied between two charged conductors or (2) a dielectric under an electric field gradient.

For use in an EMR, the mechanical design should be optimized for large local strain tuning while reducing or minimizing cross-talk. This can be achieved by suspending mechanical structures to achieve high levels of strain at the site of strain application, and by placing mechanical anchors or clamps to reduce or minimize levels of strain at sites adjacent to where the strain is applied. The mechanical tuning can be mechanically coupled to the waveguide carrying the optical mode, or they may be intentionally decoupled from it.

Figures 8A, 8B:
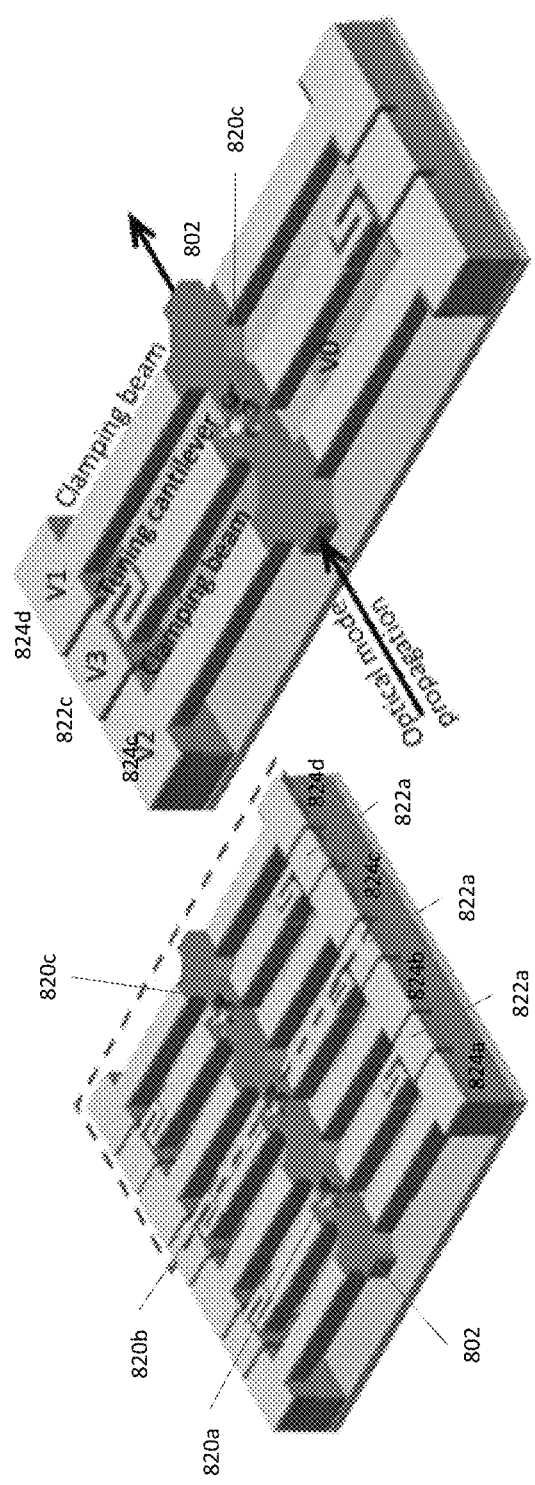
FIG. 8A shows multiple unit cells of a mechanically decoupled strain-tuned endlessly multiplexed repeater (EMR).
FIG. 8B shows a unit cell (dashed box in FIG. 8A) of the EMR of FIG. 8A in greater detail. Differential voltages between V2 and V3, V1 and V3, or V0 and V3 strain the flexible tuning cantilever to either side or towards the substrate, providing multiple degrees of freedom in straining the emitters located in the optical mode. Clamping beams reduce strain coupling between the shown unit cell and adjacent sites.

A mechanically decoupled system may have quasi-single-clamped beams oriented perpendicular to the optical waveguide to apply strain, e.g., as shown in FIGS. 8A and 8B, which are described below. This leaves design freedom for actuators and spring constants, and enables denser packing of emitters, increasing the maximum number of registers that a single EMR may host. In this example, clamping is achieved by wider (and therefore stiffer) beams connecting the suspended waveguide to the substrate.

Figures 7A, 7B:
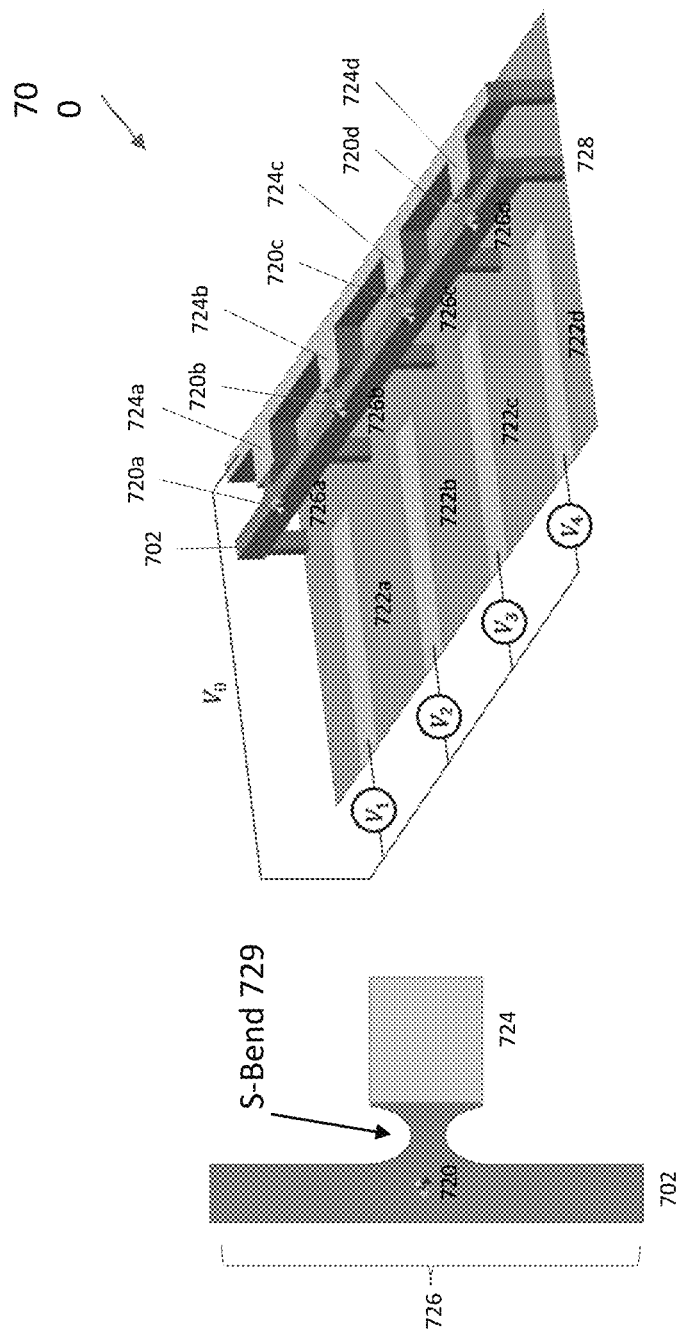
FIG. 7A illustrates fabrication of cantilever tabs on either side of an emitter-containing portion of a waveguide, permitting individual strain control of the emitters.
FIG. 7B illustrates an architecture for using multiple devices, with individual strain control mediated by electrodes at each site. Support structures between each site isolate strain from neighboring sites.

FIGS. 7A and 7B illustrate strain tuning along a diamond waveguide 702 that is sectioned by pillars 728 into double-clamped cantilever sections 726a-726d, with pillars 728 for clamping and capacitive conductive actuators 722a-722d exerting a vertical force in the center of the cantilever. As shown in FIG. 7A, an S-bend 729 is fabricated in the waveguide 702 at the site of the emitters 720, adiabatically tapering out to reduce losses in the optical mode. These bends open up into cantilever tabs 724 that hang on either side of the emitters 720. Gold is deposited along the edges of the waveguide 702 and over the tabs.

FIG. 7B shows an end-to-end arrangement of these cantilever sections 726a-726d. In between each pair of tabs is a clamp formed by a pedestal 728, to reduce strain cross-talk. A common ground voltage is applied along the entire top side of the device. Individual registers are then tuned by applying a voltage to electrodes 722a-722d below the individual ensembles of emitters 720a-720d. To increase the strain applied at each site and to decouple neighboring sites from one another, these tabs could be fabricated as soft springs.

FIGS. 8A and 8B show a waveguide 802 containing emitter clusters 820a-820c with capacitive strain actuators 822a-822c and 824a-824d placed perpendicular to the waveguide 802. The waveguide 802 can be suspended as shown in FIGS. 8A and 8B or can rest on a substrate and may be assembled via pick-and-place transfer. The actuators are single- or double-clamped cantilevers with geometrically defined stiffness. To reduce or avoid strain cross-talk, mechanical clamps are designed as stiffer beams (clamping beams 824a-824d in FIGS. 8A and 8B) or in the substrate. The clamps 824 are designed to reduce optical loss by the use of adiabatic transitions between the clamps 824 and the sections of the beam (waveguide 802) that hosts the optical mode. These clamps 824 may also serve as electrodes for horizontal capacitive actuation. Each tuning cantilever 822 is suspended, and has a conductive area, is single or double-clamped, and may be symmetric with respect to the waveguide 802. If the tuning cantilever is single-clamped, the electrical contact can be achieved via a soft spring. Electrodes in the top and bottom layers enable varying strain gradients in the horizontal and vertical directions, enabling the addressing of different dipole orientations and spatial defect distributions.

Other suitable strain tuning methods include thermo-mechanical strain tuning (e.g., electrical heating, laser-induced heating), opto-mechanical strain tuning (e.g., optical gradient force, optical pressure force), magneto-mechanical strain tuning, magnetostriction strain tuning, strain tuning with phase-change materials (e.g., shape-memory alloys (SMA), $HfO_2$), and off-chip strain tuning with macro-mechanical actuators.

5. Emitter Shelving

The EMR 600 in FIG. 6 uses emitter tuning to enable addressing of a single ensemble of defect centers at a given time, while the other ensembles of defect centers are hidden by being tuned off-resonance from the excitation laser. An alternative way to hide an ensemble of defect centers is to use emitter shelving, where the electron population of the hidden emitters is transferred to a state where it is unable to absorb the excitation laser pulse.

For instance, an emitter can be shelved in an otherwise unused manifold. For a silicon-vacancy (SiV) center in diamond, the ground state manifold contains two spin-orbit manifolds, each with two Zeeman-split spin levels that can be used as a qubit. Typically, the lower spin-orbit manifold is used as a qubit, while the upper spin-orbit manifold is unused. While this manifold does not typically exhibit a long coherence time due to emission of microwave photons, enclosing the system in a microwave photonic crystal could highly suppress these emissions, resulting in long coherence times at cold temperatures. For use in an EMR, emitters could then be resonantly driven (at microwave frequencies) to transfer their qubit state from the lower to the upper manifold. In the upper manifold, a qubit would be transparent to the excitation laser used to address adjacent SMuQRs but continue to hold its quantum information. When a qubit should be used, the same resonant driving could transfer the qubit back into the lower manifold, where it could once again be accessed.

Ionization is another way to shelve an emitter. Solid-state emitters can often be ionized by applying a short, strong, resonant pulse of light or by electrical gating. In this ionized state, the emitter is unable to absorb photons from the excitation beam. Furthermore, the removal of an electron may increase the coherence time of nearby nuclear spins, which can be used as longer-lived quantum memories, increasing the fidelity with which the repeater can operate. Finally, to re-charge the emitters, electrical gating or light resonant with the transitions of the ionized emitter can be applied, enabling optical interaction with the site once more.

6. Excitation Filtering and Reflectors to Improve Single-Photon Collection

In an EMR, the emitters emit in both directions along the waveguide, limiting theoretical efficiency to 50%. However, a reflector at one end of the waveguide reflects the photons emitted into the undesired direction, overcoming this loss. To separate the excitation laser light from the single photon emissions of interest, the reflector can be configured to transmit the excitation beam.

Referring again to FIG. 6, for example, the waveguide 602 may have a polarization-selective DBR 604 at one end. This polarization-selective DBR 604 transmits the excitation beam 619 and reflects single photons 621 emitted in the perpendicular polarization to the excitation beam 619, resulting in efficient filtering. Alternatively, an on-chip polarization beam splitter (PBS) and a broadband reflector (e.g., a Sagnac loop) can transmit the excitation beam and reflect emitted photons in the perpendicular polarization to the excitation beam. If the waveguide is a multimode waveguide, the photons and excitation beam can be launched into different waveguide modes. Higher-order modes have distinct mode profiles and mode indexes and can thus be filtered out using mode-selective reflectors or mode splitters (e.g., phase-matched directional couplers) and mode-insensitive reflectors.

This architecture allows scaling beyond the limitations created by the finite ratio of inhomogeneous distribution of emitter transition frequency to emitter transition linewidth. Instead, the scaling of this architecture is limited by propagation loss in fabricated diamond structures, which is on order 1.5 dB/cm.

7. Frequency-Multiplexed Transmission

While the SMuQRs and EMRs described above use frequency multiplexing to access qubits, the outputs of these devices are spectrally monochromatic, with the emissions converted to a common frequency (e.g., a frequency in the telecom band) before transmission. For long links or for small numbers of emitters, the qubit transmission rate may be limited by the duty cycle of the transmission protocol, which is given by the qubit initialization time (typically 10-100 µs) plus the round-trip time-of-flight across the communication channel (around 100 µs for a 20 km fiber). However, for short links or large numbers of emitters, the transmission rate may be limited by the bandwidth of the fiber; that is, the number of temporal modes that a single-frequency mode in the fiber can support.

Figure 9:
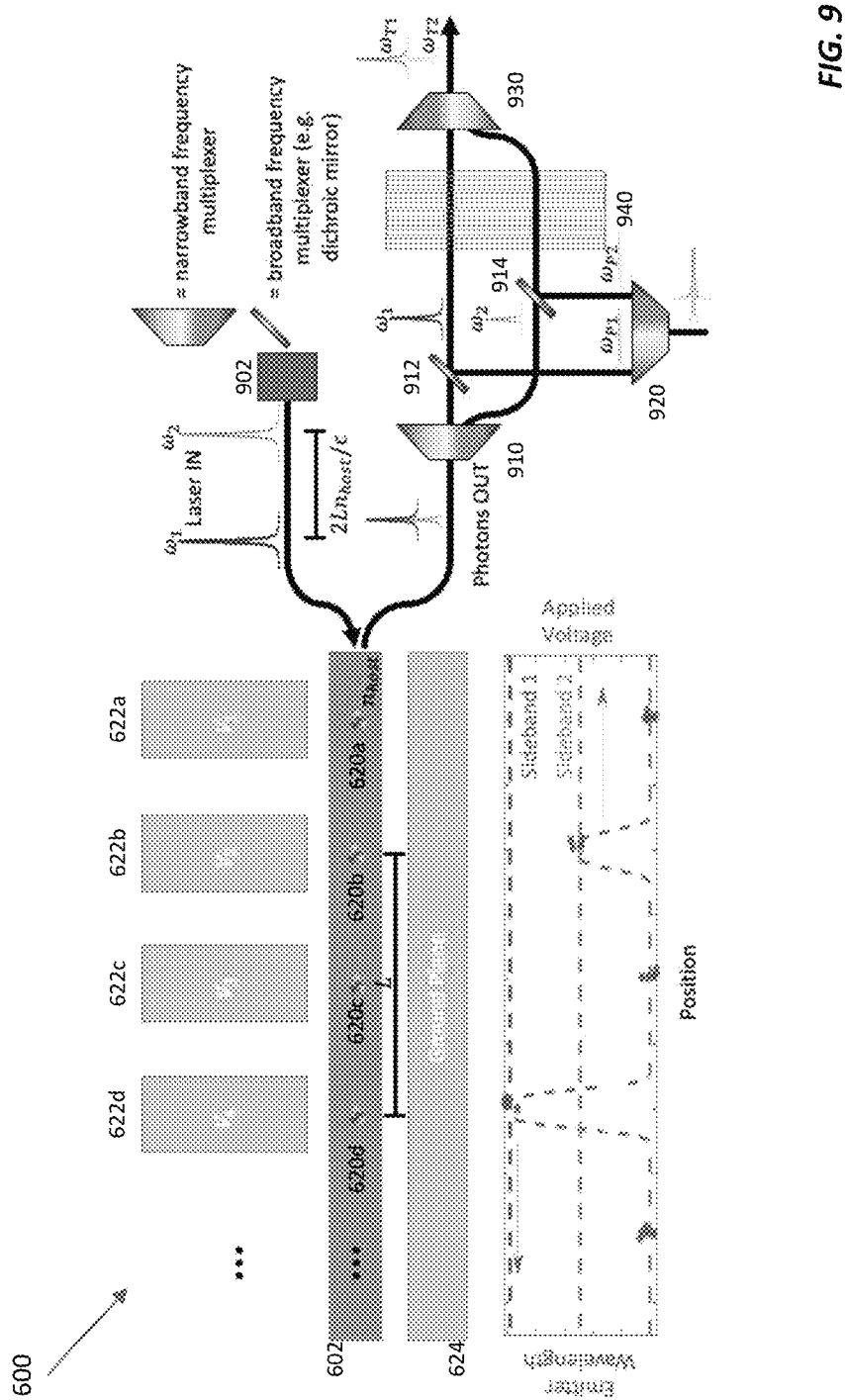
FIG. 9 illustrates frequency-multiplexed emissions with an EMR. The tuning mechanism at two spatially separated SMuQR sites are both activated simultaneously but tuned to different center frequencies. The excitation laser is then modulated to produce sidebands at two frequencies $\omega_1$ and $\omega_2$, chosen to correspond to emitter frequencies as in FIG. 5. These pulses are separated in time such that the resultant emissions they cause leave the EMR simultaneously. These emissions are then split into separate spatial paths via a narrowband (e.g., on the order of 10 GHz) frequency multiplexer. A strong pump beam (produced as in FIG. 5) with two corresponding sidebands is split with its own narrowband multiplexer before each arm is overlapped with its corresponding single photon signal via a broadband (e.g., on the order of 100 THz) frequency multiplexer, which can be implemented readily using a simple dichroic mirror. The conversion process is as above facilitated via a nonlinear crystal, and the converted signals are finally recombined into a single spatial mode via another narrowband multiplexer.

If the transmission rate is limited by the fiber bandwidth, it can be increased by operating at multiple frequency channels. The EMR provides a natural platform for frequency multiplexing. As depicted in FIG. 9, two sites 620b and 620d on the EMR 600 may be addressed simultaneously if their tuning mechanisms as described above are activated simultaneously, but set to different frequencies, here $\omega_1$ and $\omega_2$. A laser 902 is modulated (e.g., with a single-sideband modulator, not shown) to produce one pulse at $\omega_1$ and another pulses at $\omega_2$, separated in time by $2Ln_{host}/c$, where L is the distance in the emitter host material (waveguide 602) between the two sites being addressed, $n_{host}$ is the index of the waveguide mode, and c is the speed of light. In this way, the single photon emissions of the two sites 620b and 620d overlap in time and space upon leaving the EMR 600, as shown in FIG. 9.

Each of the excitation sidebands from the laser 902 is modulated as in FIG. 5A or 5B to enable addressing of individual emitters within the two sites, producing two overlapping trains of pulses. The pulse train from the defect centers 622d is centered about Sideband 1 and the pulse train from the defect centers 622b is centered about Sideband 2 as labelled in the plot at lower left of FIG. 9. However, each photon within each pulse train is at a different frequency as in FIGS. 5A and 5B, and as such, each pulse train should be down-converted as in FIG. 5.

In a SMuQR, the excitation and the pump lasers are modulated in concert, meaning the frequency-multiplexed case in FIG. 9 uses two pump sidebands as well. In FIG. 9, these sidebands are labelled $\omega_{P1}$ and $\omega_{P2}$ and are chosen such that $\omega_1-\omega_{P1}=\omega_{T1}$ and $\omega_2-\omega_{P2}=\omega_{T2}$, where the set $\{\omega_{Ti}\}$ includes telecom frequencies analogous to the current ITU band. However, if the signals at $\omega_1$ and $\omega_2$ are both pumped with both pump sidebands, this will produce four output tones—two at the desired frequencies $\omega_{T1}$ and $\omega_{T2}$, but two at undesired frequencies $\omega_1-\omega_{P2}$ and $\omega_2-\omega_{P1}$.

To prevent this, the single-photon signals should be spatially separated and individually frequency-converted with their respective pump beams. This can be accomplished with narrowband frequency multiplexers 910 and 920 as shown in FIG. 9. The outputs of the first multiplexer 910 are split into separate optical paths, where each split signal is multiplexed with its corresponding pump pulse using a narrowband frequency multiplexer 930 and a corresponding broadband frequency multiplexer 912 or 914, which can be realized readily with either integrated photonics or a bulk dichroic mirror. The paths travel through a PPLN chip 940 or other frequency converter, which produces the desired telecom signals at $\omega_{T1}$ and $\omega_{T2}$ from the pump pulses and the single-photon signals. The telecom signals are combined using another narrowband frequency multiplexer 920 for transmission to other nodes on the network.

The splittings among the signals separated in this way ($\omega_1-\omega_2$, $\omega_{P1}-\omega_{P2}$, and $\omega_{T1}-\omega_{T2}$) are largely determined by the sidebands to which the individual defect center sites are tuned, and thus can be separated by many tens of GHz. The ability to choose these spacings eases requirements on what might otherwise be a challenging filtering problem, and such multiplexers can be realized with modern integrated photonics.

8. Local Entanglement Generation

The protocol illustrated in FIG. 9 provides the connectivity and infrastructure for generating entanglement between multiple SMuQR or EMR devices located at distant nodes on a quantum network. However, the addition of local connectivity—the ability to entangle qubits located at the same network node—may have a dramatic impact on the performance of a quantum network.

FIGS. 10A and 10B show different schemes for producing entanglement between emitters within a SMuQR or EMR device. FIG. 10A shows a component block diagram for probabilistically producing entanglement between two emitters within an EMR. An input laser (not shown; e.g., laser 532 in FIG. 5A) is modulated as described in the SMuQR and EMR protocols above. However, here the input laser frequency $\omega_L$ is chosen to be the mean of two emitter frequencies (emitters 1 and 2) being addressed. The laser is then dual-sideband modulated with a first modulator 1002 to produce bands at $\omega_L \pm \omega_A$, which interact with emitters in the EMR 600 as described above.

However, instead of passing through a frequency converter, here the output of the EMR 600 is passed through a second modulator 1004 driven at $\omega_A$. This sideband is applied to both single-photon emissions, producing the quantum state:

$$|\psi\rangle = \frac{\begin{array}{c}|00101\rangle + |00011\rangle + |00110\rangle + |00020\rangle + \\ 2|10001\rangle + 2|10010\rangle + 2|01010\rangle + 2|01100\rangle + 4|11000\rangle\end{array}}{4}$$

where the terms refer to the spin state of emitter 1, the spin state of emitter 2, and the number of photons at frequencies $\omega_L-2\omega_A, \omega_L,$ and $\omega_L+2\omega_A$ respectively. Detection of a single photon at $\omega_L$ thus projects the spins into the state:

$$|\psi\rangle = \frac{|00011\rangle + |00110\rangle + |00020\rangle + 2|10010\rangle + 2|01010\rangle}{\sqrt{6}}$$

At this point, flipping each spin and repeating the protocol of excitation produces single photon emissions only for the latter two terms in the above equation. As such, detection of a single photon at $\omega_L$ produces the state:

$$|\psi\rangle = \frac{|10\rangle + |01\rangle}{\sqrt{2}}$$

which is an entangled state between the two memories. As can be seen in the full initial state equation above, performing this protocol with linear optics as drawn in FIG. 10A is successful 25% of the time before accounting for photon losses and infidelities.

FIG. 10B shows an alternative scheme for producing entanglement between emitters within a SMuQR or EMR device. This scheme uses nonlinear optics that act as frequency beam splitters 1050 and 1052, each of which implements a Hadamard gate in frequency space. (For more on frequency beam splitters, see, e.g., Lu et al., "Electro-Optic Frequency Beam Splitters and Tritters for High-Fidelity Photonic Quantum Information Processing," Phys. Rev. Lett. 120, 030502—Published 18 Jan. 2018.) As in FIG. 10A, an input laser provides an input at a laser frequency $\omega_L$, which is the mean of two emitter frequencies (emitters 1 and 2) being addressed in the EMR 600. The first frequency beam splitter 1050 generates a pair of photons at $\pm\omega_A$, which are either resonant at the emitter frequencies or can be frequency-converted to the emitter frequencies. The EMR 600 emits photons at $\pm\omega_A$, which are coupled to the second frequency beam splitter 1052. A balanced photodetector 1054 detects a photon is detected at $\omega_L \pm \omega_A$, the sign of which determines the phase of the entangled state. This protocol succeeds with 50% probability before accounting for photon losses and infidelities.

9. Benefits

The table below summarizes the number of multiplexed qubits that can be achieved with the different stages of technological development discussed above. This table also lists quantum dots in III-V materials, such as GaAs, InAs, and AlAs. While quantum dots typically exhibit coherence times too short for quantum repeater applications, they are excellent solid-state single photon sources. A SMuQR or EMR made with quantum-dot qubits would thus permit a state-of-the-art high bandwidth single-photon source.

10. Monte Carlo Simulation of SMuQR Operation

A Monte Carlo simulation can be used to determine the mean number of defects that a single SMuQR can host. Based on a desired fidelity F, calculate the minimum spacing between each emitter and its nearest neighbor(s) as $\Delta = \sqrt{\gamma^2/(1-F)}$. Then sample frequency points from a Gaussian distribution with standard deviation equal to the empirical inhomogeneous distribution of emitter frequencies, increasing the number of frequency points until at least one pair of frequency points is closer than $\Delta$. This process is repeated 10,000 times to produce a distribution, the mean of which is reported above.

11. EMR Performance

To calculate the number of quantum registers (defect center ensembles) that a single EMR can host, consider the (maximum) tolerable loss for high-fidelity quantum networking with single photon emitters. While high losses impact networking rate directly, they impact fidelity indirectly through the single-to-noise (SNR). In particular, while some sources of noise, such as those generated at the site of the emitter (residual unfiltered laser excitation, fluorescence, etc.), experience the same losses as the signal, other sources of noise (namely detector dark counts) are invariant under the loss experienced by the signal. Thus, consider the amount of loss that a single photon emission can experience before its SNR becomes limited by dark counts.

For high fidelity F=99.9% operations, the SNR should be at least $10^3$, or 30 dB. Assuming a typical detector dark-count rate of 100 Hz, this corresponds to a $10^{-7}$ dark-count probability per nanosecond, such that a single-photon emitter with a lifetime of 1 ns and 100% collection efficiency (0 dB of loss) would exhibit an SNR of $10^7$. This emitter could thus experience 40 dB of loss and maintain 99.9% fidelity quantum operations. This example calculation is performed for every quantum emitter based on its individual lifetime to find the maximum EMR length. Then assume a certain length (e.g., 10 μm) per SMuQR to calculate the number of SMuQR registers per EMR.

12. Conclusion

All parameters, dimensions, materials, and configurations described herein are meant to be exemplary and the actual

| Device Type | Emitter Type | # Qubits/Device* | Qubit Access Rate** | Limitation |
|---|---|---|---|---|
| SMuQR | Silicon Vacancy in diamond | 8 | 80 kHz | Inhomogeneous distribution ~70 GHz** |
| SMuQR | Germanium Vacancy in diamond | 20 | 200 kHz | Inhomogeneous distribution ~150 GHz |
| SMuQR | Tin Vacancy in diamond | 70 | 700 kHz | Inhomogeneous distribution ~1.86 THz |
| SMuQR | Quantum dot in III-V | 120 | 1.2 MHz | Inhomogeneous distribution ~15 THz |
| EMR | Silicon Vacancy in diamond | 200,000 | 2 GHz | Loss in diamond waveguide ~1.5 dB/cm |
| EMR | Germanium Vacancy in diamond | 440,000 | 4.4 GHz | Loss in diamond waveguide ~1.5 dB/cm |
| EMR | Tin Vacancy in diamond | 1,560,000 | 15.6 GHz | Loss in diamond waveguide ~1.5 dB/cm |
| EMR | Quantum dot in III-V | 16,000,000 | 160 GHz | Loss in SiN waveguide ~0.3 dB/cm |

*For 99.9% fidelity operation and determined by the Monte Carlo simulation described below.
**Access every memory in the device, then limited by reset time taken to be 100 μs.

parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A spectrally multiplexed quantum repeater for a quantum network, the spectrally multiplexed quantum repeater comprising:
    an ensemble of frequency-multiplexed qubits, the frequency-multiplexed qubits in the ensemble of frequency-multiplexed qubits having respective resonance frequencies distributed over an inhomogeneous band; and
    a frequency converter, in optical communication with the ensemble of frequency-multiplexed qubits, to convert single photons emitted by the frequency-multiplexed qubits from the respective resonance frequencies to single photons at a frequency in a telecommunications band.

2. The spectrally multiplexed quantum repeater of claim 1, wherein the respective resonance frequencies are in a visible portion of the electromagnetic spectrum.

3. The spectrally multiplexed quantum repeater of claim 1, wherein the frequency-multiplexed qubits comprise defect centers in a solid-state host.

4. The spectrally multiplexed quantum repeater of claim 1, wherein the ensemble of frequency-multiplexed qubits is disposed in a waveguide.

5. The spectrally multiplexed quantum repeater of claim 4, wherein the waveguide is a slow-light waveguide having a bandgap detuned from the respective resonance frequencies.

6. The spectrally multiplexed quantum repeater of claim 4, wherein the frequency-multiplexed qubits emit a first half of the single photons in a first direction and a second half of the single photons in a second direction, and further comprising:
  a reflector, at one end of the waveguide, to reflect the second half of the single photons in the first direction.

7. The spectrally multiplexed quantum repeater of claim 4, wherein the ensemble of frequency-multiplexed qubits is a first ensemble of frequency-multiplexed qubits at a first site in the waveguide, and further comprising:
  a second ensemble of frequency-multiplexed qubits at a second site in the waveguide, the frequency-multiplexed qubits in the second ensemble of frequency-multiplexed qubits having respective resonance frequencies distributed over the inhomogeneous band.

8. The spectrally multiplexed quantum repeater of claim 7, further comprising:
  a tuning mechanism, operably coupled to the waveguide, to shift the respective resonance frequencies of the first ensemble of frequency-multiplexed qubits with respect to the inhomogeneous band.

9. The spectrally multiplexed quantum repeater of claim 8, wherein the waveguide is suspended from a substrate and the tuning mechanism is configured to deflect at least a portion of the waveguide.

10. The spectrally multiplexed quantum repeater of claim 1, wherein the ensemble of frequency-multiplexed qubits is disposed in a single-sided nanophotonic cavity.

11. The spectrally multiplexed quantum repeater of claim 1, further comprising:
  a first switch, in optical communication with the ensemble of frequency-multiplexed qubits, to probe the frequency-multiplexed qubits at the respective resonance frequencies to produce the single photons at the respective resonance frequencies; and
  a second switch, in optical communication with the frequency converter, to couple the single photons at the frequency in the telecommunications band to other nodes in the quantum network.

12. The spectrally multiplexed quantum repeater of claim 11, wherein the first switch has a switching speed of 100 MHz to 1 GHz and the second switch has a switching speed of at least 1 kHz.

13. The spectrally multiplexed quantum repeater of claim 1, further comprising:
  a laser to generate pump pulses at a pump frequency;
  a modulator, in optical communication with the laser, to modulate sidebands onto the pump pulses at frequencies corresponding to the respective resonance frequencies of the frequency-multiplexed qubits; and
  a nonlinear optical medium, in optical communication with the modulator, to convert the sidebands to the respective resonance frequencies of the frequency-multiplexed qubits for interacting with the frequency-multiplexed qubits.

14. A method of distributing quantum signals over a quantum network, the method comprising:
  switching pulses among spectrally multiplexed qubits in an ensemble of spectrally multiplexed qubits in a first node of the quantum network, the pulses causing the spectrally multiplexed qubits to emit spectrally multiplexed quantum signals;
  converting the spectrally multiplexed quantum signals to temporally multiplexed quantum signals at a telecommunications frequency; and
  directing the temporally multiplexed quantum signals from the first node to other nodes in the quantum network.

15. The method of claim 14, wherein switching the pulses among the spectrally multiplexed qubits comprises generating the pulses at respective visible frequencies and the spectrally multiplexed quantum signals are at the respective visible frequencies.

16. The method of claim 14, wherein switching the pulses among the spectrally multiplexed qubits occurs at a rate of 100 MHz to 1 GHz and directing the temporally multiplexed quantum signals comprises switching the temporally multiplexed quantum signals at a rate of at least 1 kHz.

17. The method of claim 14, wherein switching the pulses among the spectrally multiplexed qubits comprises:
  generating pump pulses at a pump frequency;
  modulating sidebands of the pump pulses at frequencies corresponding to the frequencies of the spectrally multiplexed quantum signals; and
  mixing the sidebands with pulses at the telecommunications frequency to yield the pulses at frequencies of the spectrally multiplexed quantum signals.

18. The method of claim 14, further comprising:
  locking the telecommunications frequency to a reference frequency.

19. The method of claim 14, wherein the ensemble of spectrally multiplexed qubits is a first ensemble of spectrally multiplexed qubits and further comprising:
  tuning resonance frequencies of the spectrally multiplexed qubits in the first ensemble of spectrally multiplexed qubits with respect to resonance frequencies of spectrally multiplexed qubits in a second ensemble of spectrally multiplexed qubits.

20. A spectrally multiplexed quantum repeater comprising:
  a waveguide;
  spectrally multiplexed defect centers in optical communication with a mode guided by the waveguide and resonant at respective visible frequencies;
  a first laser to generate pump pulses at a pump frequency;
  a modulator, in optical communication with the first laser, to modulate sidebands onto the pump pulses at frequencies corresponding to the respective visible frequencies of the spectrally multiplexed defect centers;
  a second laser to generate a laser beam at a telecommunications frequency;
  a first frequency converter, in optical communication with the modulator, the second laser, and the spectrally multiplexed defect centers, to mix first portions of the sidebands with the laser beam to produce pulses at the respective visible frequencies, the pulses at the respective visible frequencies causing the spectrally multiplexed defect centers to emit spectrally multiplexed quantum signals at the respective visible frequencies; and
  a second frequency converter, in optical communication with the modulator and the spectrally multiplexed defect centers, to mix second portions of the sidebands with the spectrally multiplexed quantum signals to produce temporally multiplexed quantum signals at the telecommunications frequency.

* * * * *